United States Patent
Meissner et al.

(10) Patent No.: US 10,767,639 B2
(45) Date of Patent: Sep. 8, 2020

(54) COMPRESSOR ARRANGEMENT FOR COMPRESSED AIR SUPPLY FACILITY

(71) Applicant: WABCO GmbH, Hannover (DE)

(72) Inventors: Frank Meissner, Hannover (DE); Marco Seeger, Langenhagen (DE)

(73) Assignee: WABCO GMBH, Hannover (DE)

( * ) Notice: Subject to any disclaimer, the term of this patent is extended or adjusted under 35 U.S.C. 154(b) by 731 days.

(21) Appl. No.: 14/769,749

(22) PCT Filed: Feb. 18, 2014

(86) PCT No.: PCT/EP2014/000441
§ 371 (c)(1),
(2) Date: Aug. 21, 2015

(87) PCT Pub. No.: WO2014/135252
PCT Pub. Date: Sep. 12, 2014

(65) Prior Publication Data
US 2016/0001624 A1 Jan. 7, 2016

(30) Foreign Application Priority Data
Mar. 4, 2013 (DE) ......................... 10 2013 003 513

(51) Int. Cl.
| | |
|---|---|
| *F04B 35/04* | (2006.01) |
| *H02K 5/15* | (2006.01) |
| *F04B 17/03* | (2006.01) |
| *H02K 1/18* | (2006.01) |
| *F04B 27/04* | (2006.01) |
| *F04B 49/20* | (2006.01) |

(52) U.S. Cl.
CPC .............. *F04B 35/04* (2013.01); *F04B 17/03* (2013.01); *F04B 27/04* (2013.01); *F04B 49/20* (2013.01); *H02K 1/187* (2013.01); *H02K 5/15* (2013.01); *F04B 2203/0204* (2013.01); *F04B 2203/0209* (2013.01)

(58) Field of Classification Search
CPC ... F04D 25/0613–25/0646; H02K 5/00; H02K 5/04; H02K 5/15; H02K 1/12; H02K 1/187; F04B 35/04; F04B 35/01; F04B 27/04; F04B 17/03; F04B 49/20; F04B 2203/0209; F04B 2203/0204
See application file for complete search history.

(56) References Cited

U.S. PATENT DOCUMENTS

| | | | |
|---|---|---|---|
| 5,497,040 A | 3/1996 | Sato | |
| 6,004,103 A * | 12/1999 | Fisher | F04B 49/02 417/26 |
| 6,065,946 A * | 5/2000 | Lathrop | F04B 49/065 310/43 |

(Continued)

FOREIGN PATENT DOCUMENTS

| | | |
|---|---|---|
| CN | 1111412 A | 11/1995 |
| CN | 2402054 Y | 10/2000 |

(Continued)

*Primary Examiner* — Bryan M Lettman
(74) *Attorney, Agent, or Firm* — Leydig, Voit & Mayer, Ltd.

(57) ABSTRACT

A compressor arrangement for operating a compressed air supply facility of a vehicle includes a compressor having an electric motor constructed as an electronically commutated, brushless DC motor with a control circuit comprising a power electronics unit, and a pneumatic compressor. The electric motor is constructed in the form of an external rotor motor.

29 Claims, 6 Drawing Sheets

(56) References Cited

U.S. PATENT DOCUMENTS

| | | |
|---|---|---|
| 10,093,144 B2 | 10/2018 | Dieter et al. |
| 2003/0156946 A1* | 8/2003 | Tolbert, Jr. ............ B60H 1/3223 417/45 |
| 2004/0191073 A1* | 9/2004 | Iimura .................... F04B 41/02 417/44.2 |
| 2008/0260556 A1* | 10/2008 | Hoffman ................. F04B 35/04 417/423.1 |
| 2010/0221128 A1 | 9/2010 | Mellar et al. |
| 2011/0006634 A1* | 1/2011 | Nomura ................. H02K 1/187 310/216.113 |
| 2011/0133575 A1* | 6/2011 | Arashi ................. B60H 1/3229 307/326 |
| 2012/0070324 A1* | 3/2012 | Haecker ................. H02K 1/187 417/415 |
| 2012/0193845 A1* | 8/2012 | Yamanaka ............. B60G 11/26 267/64.28 |

FOREIGN PATENT DOCUMENTS

| | | |
|---|---|---|
| CN | 101796297 A | 8/2010 |
| CN | 201794753 | 4/2011 |
| DE | 939 225 C | 2/1956 |
| DE | 14 28 021 A1 | 1/1969 |
| DE | 10 2007 042 318 A1 | 3/2009 |
| DE | 102010054712 A1 | 6/2012 |
| JP | 2001263247 A | 9/2001 |
| JP | 2005334376 A | 12/2005 |
| JP | 2012154260 A | 8/2012 |
| JP | 2013019329 A | 1/2013 |
| KR | 1020120088567 A | 8/2012 |

\* cited by examiner

COMPRESSOR ARRANGEMENT FOR COMPRESSED AIR SUPPLY FACILITY

FIELD OF THE INVENTION

The invention generally relates to compressor arrangements for operating vehicle compressed air supply facilities.

BACKGROUND OF THE INVENTION

Air supply facilities for air spring facilities or other applications in a vehicle produce compressed air in order to feed it to an air spring facility, for example. The compressed air is produced by means of a compressor element, which is driven by an electric motor. A DC motor with brushes is generally used as an electric motor for this purpose. In the onboard electrical system of the vehicle, especially a motor car, this motor is supplied with electrical energy from a battery. Such batteries have an electrical voltage across the terminals in the range of from 9 to 15 V, for example. The voltage amplitude depends especially on the current loading of the battery and on its state of charge.

To operate the electric motor of a compressor, it can be connected electrically to the battery by means of a relay. The voltage of 9 V to 15 V, to remain with the example, is then applied to the motor and the motor is driven thereby. As the motor starts up, a very high starting current can occur, and this also leads to at least a temporary voltage drop in the battery. The operation of other loads in the onboard electrical system, especially the starting up of other loads in the onboard electrical system, can likewise lower the battery voltage, and the switching off of such a load can raise the battery voltage again. Such fluctuating voltages in the battery lead to different currents, which, in turn, can lead to suboptimal operating conditions and, for example, increased brush wear in the electric motor. Moreover the result is different speeds of the electric motor and hence of the compressor element, which can lead to differences in the noise generated. In particular, it is difficult to match soundproofing to a predetermined noise frequency.

A brushless electric motor is known from CN201794753U, for example. In principle, an electrically commutated brushless motor is constructed as a DC motor having a power electronics unit ("BLDC motor"). The winding is generally mounted on the stator, not in the rotor (as in the DC motor with brushes); in the case of the BLDC motor, the mechanical commutator or brush system is replaced by an electronic commutator, namely a "BLDC control circuit" for controlling a drive of the motor. In general, permanent magnets are seated in the rotor for permanent excitation. A control circuit with the power electronics unit can switch the DC supply voltage to the motor windings. Most BLDC motors have three windings, which are arranged in a star shape. By means of pulse width modulation (PWM), the control circuit can change the average voltage to the motor, for example, in order to control the rotational speed. Hall-effect sensors, for example, which are embedded in the stator, can measure the angular position of the rotor. When the rotor magnet poles then pass the Hall-effect sensors, they emit a high or low signal, thereby indicating whether this is a north or a south pole. BLDC motors can also be commutated by monitoring the back EMF signals instead of using Hall-effect sensors. The motor is then started in an open circuit, and the control then switches to the sensing of the back EMF. However, there is generally a limitation to applications with a relatively constant torque and without dynamic requirements.

DE 10 2007 042 318 A1 describes a compressor arrangement of the general type under consideration having a compact dry piston compressor having at least one cylinder for compressing air of an associated piston, which can be moved using an electric motor by a crank mechanism consisting of a crankshaft and a connecting rod. For this purpose, the crank mechanism is accommodated in a first half of a housing, and the electric motor is accommodated within a second half of the housing. A rolling bearing common to the crank mechanism and to the electric motor is inserted in a dividing wall dividing the housing halves. The electric motor is embodied in the manner of a brushless DC motor, the stator of which consists of coil windings with an iron core and the rotor of which is equipped with permanent magnets. An electronic commutator of the electric motor is arranged on a circuit board accommodated in the second housing half. The electric motor, which is designed as an internal rotor motor, can have a rotor formed integrally with the crankshaft, which is rotatable within the stator. A compressor arrangement of this kind is capable of further improvements as regards control and structural design.

A pneumatic facility of the general type under consideration is constructed, in particular, in the form of a pneumatic spring system of a vehicle, which is operated using a compressed air supply facility.

A compressed air supply facility is used in vehicles of all kinds, especially to supply an air spring facility of a vehicle with compressed air. Air spring facilities can also include leveling devices, by means of which the distance between the vehicle axle and the vehicle body can be adjusted. An air spring facility of a pneumatic system comprises a number of pneumatic bellows pneumatically connected to a common line (gallery), which can raise the vehicle body as the compressed air charge increases—also referred to as air admission—and can correspondingly lower the vehicle body as the compressed air charge decreases—also referred to as venting. In this case, there is generally a need for compressed air flows at pressures of up to 20 bar or above. With increasing distance between the vehicle axle and the vehicle body or ground clearance, the spring travels become longer and it is also possible to compensate for larger irregularities in the ground without contact with the vehicle body. Such systems are increasingly being used for preference in all-terrain vehicles and sport utility vehicles (SUV). In the case of very powerful engines, especially in SUVs, it is desirable to provide the vehicle with a relatively small ground clearance for high speeds on the road, on the one hand, and to provide it with a relatively large ground clearance for off-road use, on the other. It is furthermore desirable to implement a change in the ground clearance as quickly as possible, something that increases the demands as regards rapidity, flexibility and reliability of a compressed air supply facility, especially also that of a compressor arrangement. Nevertheless, this should involve as little wear as possible and be as robust and compact as possible and, in particular, should meet the installation space requirements in a vehicle.

In order to ensure long-term operation of the compressed air supply facility, a pneumatic main line of the compressed air supply facility has an air dryer, by means of which the compressed air can be dried. Accumulation of moisture in the pneumatic system is thereby avoided. At relatively low temperatures, moisture can lead to crystal formation, which damages valves, and can furthermore lead to unwanted effects in the compressed air supply facility and in the pneumatic facility. An air dryer has a desiccant, usually granules, through which the compressed air can flow, allowing the granules to remove moisture contained in the compressed air by adsorption. If appropriate, an air dryer can be designed as a regenerative air dryer. In this case, the dried compressed air from the pneumatic facility, in particular an air spring facility, is made to flow through the granules during each venting cycle, usually as a countercurrent but, depending on the design, possibly also as a co-current relative to the air admission direction. Regeneration of the air dryer is made possible essentially by a pressure change at the air dryer, wherein a pressure present during regeneration, as compared with that for adsorption, is as a rule lower in order to allow release of moisture from the granules. For this purpose, the vent valve arrangement can be opened, wherein the regenerability of the air dryer is generally dependent on the pressure conditions and the pressure change amplitude in the compressed air supply facility. For "pressure change adsorption" of this kind too, it has proven desirable to make a compressed air supply facility flexible and, at the same time, reliable. In particular, the aim is, on the one hand, to allow relatively quick venting, while a sufficiently high pressure change amplitude at a low air pressure—i.e., during regeneration—should nevertheless be available for regeneration of the air dryer.

It is desirable to adapt a compressed air supply facility to the requirements of a vehicle in a manner that is as advantageous as possible; this applies to a pneumatic, structural and/or electrical and/or electronic configuration thereof—in particular, it applies to a compressor arrangement for operating the compressed air supply facility.

SUMMARY OF THE INVENTION

Generally speaking, it is an object of the present invention to provide an apparatus and a method by which compressed air can be made available in a better way; in particular, an improved structural and/or electrical and/or electronic configuration thereof. In particular, it is an object of the present invention to provide a compressor arrangement that is relatively compact, robust and relatively flexible, for operation of a compressed air supply facility. It is a further object to embody the apparatus in a simplified way and to design it for relatively reduced servicing and/or assembly outlay; the intention is likewise to sustainably improve the service life of the apparatus. It is yet another object of the invention to provide an apparatus that can be operated in an improved manner, in particular in a specified operating context, in terms of electrical, pneumatic and structural aspects. Wow and flutter and noise pollution are reduced, and synergistic use of electronic and electrical parameters of existing peripheral systems for open-loop and/or closed-loop control of an apparatus for producing compressed air are made possible.

According to an embodiment of the present invention, the compressor arrangement is designed for operating a compressed air supply facility of a vehicle and has a compressor having: an electric motor, which is constructed as an electronically commutated, brushless DC motor with a control circuit comprising a power electronics unit (BL-DC motor), and a pneumatic compressor element; the electric motor being constructed in the form of an external rotor motor.

In the context of a preferred embodiment, a measure of the energy storage capacity for rotational energy of the rotor can be stored.

The compressed air supply facility having the compressor arrangement according to an embodiment of the present invention is preferably designed for operating a pneumatic facility, in particular an air spring facility of a vehicle, and has: a compressed air feed, a compressed air port leading to the pneumatic facility and a vent port leading to the surroundings; a pneumatic main line, which has an air dryer, in particular a pilot controlled check valve of a valve arrangement, between the compressed air feed and the compressed air port; and a vent line having a vent valve, in particular in combination with a control valve of a valve arrangement, between the compressed air port and the vent port, wherein the compressed air feed can be supplied with compressed air that can be produced by the compressor arrangement.

The pneumatic facility is preferably constructed in the form of an air spring facility, which has a gallery and at least one branch line connected pneumatically to the gallery and having a bellows and/or an accumulator and a directional control valve arranged ahead of the bellows and/or the accumulator.

The compressed air supply system having a pneumatic facility and having a compressed air supply facility is preferably designed for operating the pneumatic facility with a compressed air flow, in particular an air spring facility of a vehicle, preferably of a motor car, wherein the pneumatic main line pneumatically connects a compressed air feed from a compressor and a compressed air port leading to the pneumatic facility.

The vehicle, in particular, the motor car, is provided with a pneumatic facility, in particular an air spring facility, and a compressed air supply facility for operating the pneumatic facility with a compressed air flow.

It should be understood that the inventive embodiments are not restricted to applications having a pneumatic facility in the form of an air spring facility. Thus, the inventive compressor arrangement—with or without a compressed air supply facility for producing a compressed air flow and/or for preparing compressed air—can also be used for other automotive pneumatic facilities. These include any type of compressor application in the vehicle sector, whether with a dynamic or static operating requirement profile, especially, for example, for an air-conditioning compressor application, in particular as part of an air-conditioning system in vehicles, for electrohydraulic compressor applications, in particular as part of a servo steering system or as part of a pump, in particular for an ABS/EBS hydraulic pump or a vacuum pump or the like.

A compressor arrangement for operating a compressed air supply facility should provide a compressor in the form of a pneumatic compressor element which can be driven via a drive having an electric motor. An electronically commutated brushless motor—to this extent referred to as a brushless DC motor (BL-DC motor)—is advantageously suitable for constructing the compressor arrangement in a compact way and can nevertheless be configured such that it can be operated sustainably and flexibly by means of the use, in accordance with embodiments of the present invention, of the electric motor in the form of an external rotor motor; this being the case, even given concepts with brush-fitted electric motors, which are initially less expensive overall by way of comparison. Such an electronically commutated, brushless electric motor can be embodied in a further improved way if the electric motor is constructed in the form of an external rotor motor. This provides the basis for enabling even dynamic requirements in the automotive sector to be met through the exploitation of an increase in the moment of inertia of the external rotor motor by means of the BLDC motor.

It is furthermore advantageously possible, by means of the structural design of the electric motor in the form of an external rotor motor, to achieve a considerable reduction in the installation space for the electric motor and hence for the compressor arrangement and also for the compressed air supply facility. An external rotor motor brings with it considerable advantages for the design, in particular the structural design, of the compressor arrangement.

The compressor element can be constructed as a single-cylinder compressor element. However, the compressor preferably has more than one cylinder; in particular, it can be constructed as a two-cylinder or multi-cylinder compressor element to form a two- or multi-stage compressor. It is possible for a stepped piston having two or more steps to be arranged in a two-cylinder or multi-cylinder arrangement of the compressor element to form the two- or multi-stage compressor. A stepped piston in a two-cylinder or multi-cylinder arrangement of the compressor element is capable of being configured in a space-saving, efficient and flexible way.

In particular, a whole series of advantages in terms of outlay when producing and servicing the compressor arrangement can be obtained, these advantages being based, inter alia, on a reduction in the number of components, simplified assembly or the possibility of an integrated design or the elimination of separate parts. Thus, for example, a balance weight, a housing cover, a separate crankshaft, a pressed composite part can be achieved or are possible in a technically reliable way not otherwise possible without the embodiments according to the present invention (or not possible in the same advantageous way). In particular, it is possible, for example, for the electric motor to be accommodated in an advantageous way in a combined crankcase and/or motor housing in the form of an integrated drive housing.

Likewise, it is found that the magnetic properties of an external rotor motor can be used in an improved way to improve the performance of the electric motor. Moreover, mechanical loads on the electric motor can be achieved with an improved support bearing while eliminating the brushes. Overall, this leads to increased service life of the motor.

An improved mode of operation of the motor is achievable simply by the fact that wow and flutter are fundamentally reduced in the case of an external rotor motor owing to an increased rotational moment of inertia; this has already taken into account a reduced susceptibility to wobbling operation with high current amplitudes. Irrespective of this, a rotor as an external rotor in an external rotor motor can be serviced, balanced and supported in an improved way.

In one embodiment, the electric motor is connected for control to an electronic control circuit, which is designed to commutate the brushless motor electronically. The electric motor is preferably connected to an electronic commutator and at least one electronic relay and/or a DC-DC converter is provided in the power electronics unit, such that the power electronics unit has a DC voltage source as an input and an AC voltage source as an output.

A closed-loop control system, which can be implemented especially in the context of the control circuit, is based, in the context of an embodiment, on the energy storage capacity of the rotor—an external rotor, in particular a rotor bell or the like—and/or uses this to produce an improved "smooth" current profile. The storage capacity of the external-rotor-type rotor is obtained principally on the basis of its larger radius in comparison with its internal-rotor-type rotor and also given the possibility of increasing the mass at the outer radius of the external-rotor-type rotor. It is thereby advantageously possible to avoid reactive effects on the onboard electrical system when the electric motor is subject to high loads. It is possible, in particular, by means of closed-loop control, using the increased momentum of the external-rotor-type rotor in comparison with an internal-rotor-type rotor, to attenuate and/or reduce and/or delay load peaks in the onboard electrical system of the vehicle in an improved manner; it is thereby possible to avoid superposition of peak amplitudes in the case of a plurality of loads being used simultaneously. As a result, it is possible to achieve relief of the load on the onboard electrical system of the vehicle.

Preferably, the electronic control circuit further has: a control module that is designed to store a measure of an energy storage capacity for rotational energy of the rotor, in particular, to monitor and or perform open-loop or closed-loop control of an angular speed of the rotor. Thus, it is advantageously possible, for example, to assist the storage of rotational energy in the external-rotor-type rotor during a startup in a first circumferential part of an angular motion (e.g., ¾ of a circumference during a starting angular motion (especially the acceleration phase)) and/or to assist the discharge of rotational energy by the external-rotor-type rotor during a rundown process in a second circumferential part of an angular motion (e.g., ¼ of a circumference during a rundown angular motion (especially the compression phase)). In this context, monitoring of the angular speed is advantageous in order, first of all, to detect a wobbling mode of the electric motor and, to this extent, the prerequisites for avoiding a wobbling mode or for shutting it down as quickly as possible are created.

Also, it is possible to implement a suitable speed significantly above the wobbling limit by means of the control module. At the same time, a preferred prerequisite for the first development consists in an operating point of a BLDC motor, the definition of which is improved to the greatest possible extent. This can be achieved, in particular, by means of speed control. Preferably, the electronic control circuit further has a control module that is designed to monitor a speed of the rotor, in particular to perform open-loop or closed-loop control of a speed of the rotor. In particular, the electric motor is connected to a speed controller, which is designed to set the operating voltage at the motor in an adjustable manner, preferably holding it constant or increasing it.

Speed monitoring is at any event beneficial for securing the operating point. This advantageously results in the possibility of fault diagnosis (e.g., detection of a motor fault by way of matching or plausibility control of different parameters, e.g., from a motor current and speed measurement).

By means of a bandwidth, defined by control, of an angular speed and/or speed of the external-rotor-type rotor, it is advantageously possible to implement optimized matching of acoustics of the compressor arrangement to the vehicle. Thus, a "whisper mode" of the compressor arrangement can be implemented in the context of the electronic control circuit, for example; e.g., a "whisper mode" of the compressor arrangement with a reduced speed above the wobbling mode of the electric motor. For example, the angular speed can be kept constant for a "whisper mode". It is then possible, in addition or as an alternative, to permit a higher current ripple but lower wow and flutter. Use can also be made of these to make up for non-compensatable vibration transmission to the vehicle. "Anti-noise" control of the compressor arrangement can be introduced by means of the electric motor in the context of the electronic control circuit but also, in addition or as an alternative, in conjunction with or via a central vehicle controller. These and other developments are advantageous, in particular, in the case of an electric or hybrid vehicle, for example, in town traffic or when stationary for instance. These and other developments can also be supported by advantageous primary and secondary support for the electric motor and/or compressor, on the one hand, and of the compressor arrangement on the vehicle, on the other hand.

It is further advantageous in the context of speed monitoring largely to eliminate, at least to reduce, dependence of the speed of the compressor, in particular of the electric motor, on the voltage situation in the onboard electrical system. It can be advantageous to provide matching of the motor speed to an optimum functioning range of the overall assembly, e.g., in respect of the internal valves, piston speeds, bearings, allowance for motor-specific characteristic curves and parameters (speed; torque profile etc.). In particular, it is advantageous to achieve a minimization of the wear on the compressor by implementing a limitation of the speed by means of speed control if the piston speeds are too high, for example.

For this purpose, electric motor control and/or monitoring in real time can be provided for a BLDC motor.

For example, it is advantageous to read out the motor speed via an unenergized coil and to use this as a monitoring value and/or to use it as an ACTUAL value for speed control. A mechanical fault, e.g., the locking of the electric motor, can advantageously be detected.

By way of example, it is further advantageous to provide evaluation of the current pulsation (e.g., peak-peak evaluation for speed analysis and/or averaging to determine power consumption).

In particular, it is advantageous to provide a control module that can determine the current crankshaft position. It is thereby advantageously possible to influence the starting and rundown behavior, especially, for instance, by means of determining the crankshaft position from a current peak at the top dead center position thereof. For example, the control module can maintain a high but defined torque (current) until a top dead center position of the electric motor has been reached or passed or until the motor is running normally; a shunt can be used for this purpose.

Control of the electric motor in the form of an external rotor motor is possible in a synergistic way and with synergistic use of existing peripheral systems in a pressure control mode. Indeed, control can be used for electronic commutation of the brushless motor in a synergistic way in order to make available a pressure control mode. An external rotor motor designed to be operated in a pressure control mode brings with it considerable advantages, in particular, for the electrical and/or electronic design of the compressor arrangement. A pressure control mode should be taken to mean that the compressor is approved for appropriate pressure loads and/or a development of pressure in the compressor element is specifically monitored and controlled. In the case of processes where time is not critical, for example, it is advantageous to lower a pressure load by means of the electronic control circuit. For this purpose, slower accumulator or bellows filling by means of a reduced load speed can be provided where there is a lack of energy and a demand for air, for example. On the other hand, it is possible when required, especially in the case of processes where time is critical, to increase a pressure load in a controlled manner; for this purpose, it is possible, for example, to use rapid lifting from compressor element by means of overspeed, e.g., a boost mode.

According to another embodiment of the present invention, a control module can be provided that is designed to implement a gentle startup and/or rundown control operation, to limit a startup current and/or a rundown current of the electric motor (CSS), in particular to set the operating voltage at the motor in an adjustable manner, preferably holding it constant or reducing it. A complete armature winding can have three windings of three coils, which are connected, for example. At least one winding of the complete armature winding is preferably connected to an electric and/or electronic control circuit, with the result that a pressure control mode and/or gentle startup and/or adaptation to an onboard electrical voltage for the electric motor can be accomplished by means of voltage regulation. For example, it is possible to implement current limitation during starting and operation and/or minimization of the current peaks in the case of a "gentle startup" function, such as a slower speed increase for the electric motor. It is thereby possible to prevent a load reversal shock on a shaft of the electric motor and/or compressor about the rotating axis due to a spontaneous increase in the back torque.

It is also possible to provide for running down with the minimum possible power consumption (e.g., close to a bottom dead center position of the electric motor) to be used to relieve the load on an onboard electrical system by bringing about a reduction in a current flank associated with the minimum power consumption. For this purpose, a hard shutdown at minimum current can be used; the control module can obtain a reference for each revolution.

In addition or as an alternative, it is advantageously possible to provide controlled, electronic braking of the motor at the shutdown torque. This can also be used to reduce a wobbling motion about the motor axis. This can be implemented effectively, especially owing to the higher mass of the external-rotor-type rotor.

In one embodiment, the armature winding is connected to the external control circuit and/or an onboard electrical system by means of an electronic relay and/or a DC-DC converter.

The electric motor is preferably connected to an electronic control circuit in terms of load and/or control. For this purpose, control current and/or load current can pass through the controller. The control circuit is preferably arranged on the outside of a housing of the compressor arrangement, preferably comprising at least one electronic relay and/or a DC-DC converter, and one or more control module embodiments described herein.

Preferably, the electric motor is connected for control to an electronic control circuit, which is designed to electronically commutate the brushless motor. In this case, the electronic control circuit is further designed to operate the electric motor in a pressure control mode.

Advantageously, the control circuit is accommodated as an internal control circuit in a housing of the compressor of the compressor arrangement. On the one hand, installation space for a power electronics unit and/or the control circuit can be created in the housing of the compressor; i.e., without significantly increasing the installation space requirement of the compressor. On the other hand, in the case of a BLDC motor of the type under consideration, short cable lengths without twisting can be most advantageous, e.g., in order to keep electromagnetic emissions as low as possible. Nevertheless, it is also possible to provide an external control circuit, i.e., outside the compressor, in particular outside the electric motor, i.e., outside a housing of the compressor and/or electric motor, in particular outside a combined compressor and motor housing, even in cases in which there is installation space available externally. For example, it is also advantageously possible for a control circuit to be provided as part of or in the vicinity of the ECU or some other central vehicle controller; synergistic effects can thereby be exploited.

In one embodiment, the control circuit is connected to an electronic commutator. Preferably, the control circuit further has a pressure control input and/or a connection to a speed controller. On this basis, the control circuit is designed to set the operating voltage at the motor in an adjustable manner.

In particular, the control circuit is designed to hold the operating voltage at the motor constant or to increase it. At the same time, the control circuit preferably has a control module designed to implement soft startup control, limiting a starting current of the electric motor. In the context of the operating voltage that can be set in an adjustable manner, it can prove advantageous to hold this voltage constant or to lower it.

To set an operating voltage, the electric control circuit is designed to adapt an operating voltage, preferably in the form of an AC voltage source, to an onboard electrical system voltage—preferably alternately or optionally alternately or with the possibility of combination or simultaneously—in one or more of the voltage ranges, preferably a DC voltage, selected from the group of ranges comprising:
a voltage between 8 V and 50 V;
a voltage between 10 V and 15 V, preferably 12 V,
a voltage between 14 V and 37 V,
a voltage between 42 V and 49 V, preferably 48 V,
a voltage between 200-650 V.

This takes into account that a vehicle can be provided with an advanced 48 V onboard electrical system, for example, but that it can additionally have a second onboard electrical system with the hitherto customary 12 V onboard electrical voltage. It is initially an open question as to whether the first and/or the second onboard electrical voltage is made available by means of a battery and/or whether the voltage is produced by means of a converter. It is also possible in the context of a hybrid drive for a vehicle for at least one first and one second onboard electrical system to be operated in parallel, it being possible for at least up to three onboard electrical systems to be provided. According to the above-mentioned embodiment, the compressor element can then be operated on all three onboard electrical systems, for example, but only on one of the systems at the same time.

The electric and/or electronic control circuit can preferably have a control module, in particular at least one electronic relay and/or a DC-DC converter. In the context of a preferred embodiment, an electric and/or electronic control circuit comprises a DC voltage output for supplying a constant DC supply voltage with a first output amplitude for controlling the electric motor of the compressor and a DC-DC converter for producing the DC supply voltage. The DC-DC converter has a step-down converter and/or a step-up converter for this purpose.

The electric and/or electronic control circuit of the compressor arrangement preferably further has a first DC voltage input for connection to a first DC voltage source and/or a second DC voltage input for connection to a second DC voltage source, wherein the first DC voltage source supplies a first variable input voltage, which corresponds approximately to the first output amplitude and/or is lower, and the second DC voltage source supplies a second input voltage, which is higher than the first output amplitude.

As regards the structural design of the compressor arrangement, the construction of the electric motor in the form of an external rotor motor offers a particularly advantageous foundation for implementing advantages in terms of installation space and stability of running.

In particular, the compressor element can be driven by means of a drive formed by the electric motor and a crank mechanism, wherein the drive is accommodated in an integrated drive housing surrounding the crank mechanism and the electric motor. In particular, the integrated drive housing combines a motor housing and a crankcase and adjoins a piston housing.

It is advantageous if the electric motor has a stator, a rotor and a drive shaft coupled to the rotor, wherein the stator is held in the rotor in a manner separated by an air gap and is surrounded rotatably by the rotor, wherein the rotor is constructed with a rotor bell. In particular, it is preferred that the rotor carries a number of permanent magnets, and that the stator carries an armature, in particular a laminated core, having an armature winding, which is preferably connected to an electric and/or electronic control circuit.

The compressor element preferably has at least one connecting rod and/or at least one piston, which can be driven via a crankshaft, wherein the crankshaft is coupled to the drive shaft.

In principle, the permanent magnets can be formed in a comparatively simple and low-cost way on the basis of a ferrous material in the form of ferrite. Other materials, which can have weight advantages, are also suitable for advantageous magnetic design of the stator.

Preferably, the permanent magnets are formed on the basis of a ferrous material containing a cobalt compound, such as an aluminum-nickel-cobalt or samarium-cobalt-iron compound. The permanent magnets can also be formed on the basis of a ferrous material containing a bismuth compound, in particular a bismuth-manganese-iron compound (bismanol). According to one embodiment, the permanent magnets are formed on the basis of a ferrous material containing a rare-earth compound, such as a neodymium compound, preferably a neodymium-iron-boron compound.

In a preferred embodiment, a crankpin formed eccentrically with respect to the motor axis, which forms the crankshaft, adjoins the drive shaft on the motor output side. This can be implemented in a compact way and offers the basis for further embodiments.

The crankpin can be attached to the drive shaft integrally or by means of an interference fit or similar frictional and/or positive connection. In addition or as an alternative, it is advantageously possible, at least in a connection part, for the rotor bell to be attached integrally or by means of an interference fit or a similar frictional and/or positive connection. In a first variant of this embodiment, the rotor bell can be attached to the drive shaft. In a second variant, which is an alternative or can be used in combination, the rotor bell is attached to the crankpin. In this way, it is possible to use the drive shaft, the crankpin and at least the connection part to form a crank mechanism component that is integral or formed by means of an interference fit or a similar frictional and/or positive connection.

A crank mechanism component of this kind can be supported in a stable manner and with advantages in terms of wow and flutter and/or noise generation. Nevertheless, the installation space for a bearing arrangement can be made relatively flexible, preferably according to requirements, and compact.

In a first variant of this embodiment, the crank mechanism component can be supported by a bearing arrangement comprising a big end bearing and at least one axle bearing, in particular a big end bearing, preferably in the form of a rolling bearing, and a first and a second axle bearing. The bearing arrangement preferably has a big end bearing, a first axle bearing (A bearing) and a second axle bearing (B bearing), the first axle bearing (A bearing) and/or the second axle bearing (B bearing) being formed by at least one rolling bearing or one needle bearing having at least one bearing sleeve.

In a second variant, the crank mechanism component in combination with a counter bearing piece can be supported by a bearing arrangement comprising a big end bearing, an axle bearing and a counter axle bearing, in particular a big end bearing and precisely one first or one second axle bearing and the counter axle bearing. Thus, the bearing arrangement preferably has a big end bearing, in the form of a rolling bearing, and a first axle bearing (A bearing) or a second axle bearing (B bearing) and a counter axle bearing.

Preferably, the bearing arrangement comprises a big end bearing, precisely one axle bearing, namely the first axle bearing, and a counter axle bearing. In another modification, the bearing arrangement can comprise a big end bearing, precisely one axle bearing, namely the second axle bearing, and a counter axle bearing.

It is possible to obtain a balance weight by means of the rotor bell; by means of a compensating hole or similar removal of material, for instance, or by means of additional material applied on one side, for instance.

In addition or as an alternative, it is possible to form the crank mechanism component or the counter bearing piece with a balance weight on the motor output side and eccentrically with respect to the motor axis.

In particular, it is possible in a first variant of this embodiment for the balance weight to be formed between the big end bearing and the first axle bearing (A bearing) on the crank mechanism component, in particular integrally as part of a crankpin.

It is possible in a second variant for the balance weight to be formed between the big end bearing and the counter axle bearing on the counter bearing piece integrally as part of a counter bearing piece.

The drive shaft can be supported in a first axle bearing, which is arranged directly adjacent to a big end bearing, being supported only in the first axle bearing.

The rotor and/or the drive shaft can be supported in a second axle bearing (B), which is arranged spaced apart from a big end bearing at least partially by the drive shaft, being supported only in the second axle bearing.

To achieve relatively stable support, the first and/or second axle bearing can be arranged outside the rotor bell. To achieve relatively space-saving support, the first and/or second axle bearing can be arranged inside the rotor bell.

The compressor element preferably has a connecting rod, which can be driven by means of a crankshaft, wherein the crankshaft is coupled to the drive shaft and wherein the drive shaft has an extension formed eccentrically with respect to the axle shaft on the output side, the extension forming the crankshaft. The extension is preferably attached integrally.

Advantageously, drive shaft has a diameter of less than 20 mm, preferably less than 15 mm—and, preferably, in a region of 12 mm or less. This is conducive overall to a compact design of the compressor arrangement and of the parts of the compressed air supply facility that are attached thereto.

This structural design of the compressor arrangement serves as a preferred basis for the support of the drive shaft and/or of the rotor in combination with the support of a connecting rod on the crankshaft.

In a first variant, which can be formed independently of other variants, the drive shaft is supported in a first bearing (A bearing), which is accommodated in the electric motor, in particular in a housing of the electric motor. The drive shaft is preferably supported only in the first axle bearing. The latter option avoids static over-determination and can be implemented in the context of a suitably designed rolling bearing and/or needle bearing. For this purpose, a counter-weight bearing and/or a counterweight on a rotating part, such as the drive shaft and/or the crankshaft, can be employed.

In a preferred second variant, which can be implemented independently of other variants, the rotor and/or the drive shaft is/are supported in a second axle bearing (B bearing); in particular, only in the second axle bearing. The latter option once again avoids static over-determination and can be implemented advantageously using a counter bearing and/or counterweight on a rotating part, e.g., by means of a rolling bearing and/or needle bearing.

Both in the first and in the second variant, a connecting rod is additionally supported on a big end bearing between the crankshaft and the connecting rod.

The possibility of supporting the rotor additionally or alternatively to the drive shaft is advantageous, especially in the context of the design of the electric motor as an external rotor motor. With particular advantage, the rotor in one embodiment can be supported on the rotor bell additionally or alternatively to the drive shaft, e.g., in a rolling bearing. This increases the reliability of positioning of the rotating parts of the compressor arrangement.

Both the first axle bearing and the abovementioned second axle bearing can advantageously be provided in the electric motor, that is, in a housing of the electric motor, e.g., a housing closure of the electric motor or, alternatively, in the compressor element, in particular in a compressor housing, preferably in a compressor housing closure of the compressor element. It is advantageous to arrange the first and/or second bearing in a housing cap, for example in a housing cap on a housing closure of the electric motor or in a housing cap on a housing closure of the crankcase of the compressor element.

In the context of a preferred embodiment, the first axle bearing (A bearing) can be arranged as an axle bearing on the motor output side, directly adjacent to a big end bearing; a big end bearing is intended to mean an axle bearing between the crankshaft and the connecting rod. In addition or as an alternative, the second axle bearing (B bearing) can be arranged directly adjacent to a housing closure. In particular, it is possible for this purpose for the second axle bearing to be designed as an axle bearing situated opposite the axle bearing on the motor output side.

At the same time, the first axle bearing (A bearing) can be arranged as an axle bearing on the motor output side, directly adjacent to a big end bearing, and directly adjacent to a housing closure.

Thus it is advantageous in general terms for the second axle bearing to be arranged adjacent to a motor housing closure, in particular as an axle bearing situated opposite the axle bearing on the motor output side, opposite an output side of the motor (see FIG. 6).

The embodiment shown in FIG. 7 conforms in general terms to the construction in which the second axle bearing is arranged adjacent to a compressor-element housing closure, in particular as a bearing situated opposite the axle bearing on the motor output side, on an output side of the motor.

Thus—in a manner similar to the embodiment shown in FIG. 7—the big end bearing can be arranged in general terms directly between the first and the second axle bearing. In addition or as an alternative, it is also possible, as illustrated in FIG. 6 for example, for the big end bearing to be arranged adjacent to the first axle bearing and indirectly adjacent to the second axle bearing; for this purpose, the big end bearing and the second axle bearing can be spaced apart by a drive shaft and/or by the rotor, for example.

A rolling bearing is a preferred form of a bearing for the embodiment of the first and/or second bearing. Particularly in the case where the first and/or second axle bearing is/are supposed to be the only axle bearing for the drive shaft and/or the rotor, it is advantageous to embody the axle bearing as a bearing sleeve.

Preferably, the drive shaft is supported in a bearing sleeve, in particular in the form of a needle bearing in the electric motor. As a possibility, only the bearing sleeve is provided, while a connecting rod is additionally supported on a big end bearing between the crankshaft and the connecting rod.

It can be advantageous that the big end bearing and/or the first axle bearing and/or the second axle bearing have a balance weight. A balance weight is formed on the drive shaft on the motor output side and eccentrically with respect to the axle shaft, between the big end bearing and the first axle bearing. In addition or as an alternative, a balance weight can be formed on the drive shaft and/or the crankshaft on the motor output side and eccentrically with respect to the axle shaft, between the big end bearing and the second axle bearing.

The first axle bearing (A bearing) is preferably fixed on an intermediate wall of the drive housing as an axle bearing on the motor output side.

In addition or as an alternative, the second axle bearing (B bearing) can be fixed, as an axle bearing situated opposite an axle bearing on the motor output side, on a housing outer wall, associated with the electric motor, of the drive housing, in particular on a protrusion thereof, preferably a housing cap, in particular adjacent to an electric motor housing closure.

In addition or as an alternative, the counter axle bearing can be fixed, as an axle bearing situated on the motor output side, on another housing outer wall, associated with the crank mechanism, of the drive housing, in particular on a protrusion thereof, preferably a housing cover plate, in particular adjacent to a compressor-element housing closure.

The stator and/or the rotor can be held by means of a cantilever, which has a curved cantilever arm section having an approximately V-shaped cross section. Fundamentally, the cantilever arm section extends transversely to the drive shaft. To hold the stator, the cantilever on the one hand preferably adjoins a motor housing closure and, on the other hand, adjoins the stator by means of a cantilever arm extending transversely to the axle shaft of the drive shaft.

In a first modification, a first cantilever arm section for the stator can start at the drive housing. In addition or as an alternative, it is possible, in a second modification, for a second cantilever arm section for the rotor to start at the drive shaft and/or the crankpin. In both cases, for example, the first and/or second cantilever arm section, in particular, can be held integrally or by means of an interference fit or a similar frictional and/or positive connection.

To form the cantilever on the rotor, it is advantageous if, at one end, the cantilever adjoins the rotor and, at the other end, adjoins the drive shaft in the form of a cantilever arm extending transversely to the axle shaft of the drive shaft. The cantilever arms adjoining the rotor and the stator are preferably arranged opposite one another on the housing closure side and the output side, in particular being spaced apart by the stator.

Still other objects and advantages of the present invention will in part be obvious and will in part be apparent from the specification.

The present invention accordingly comprises the features of construction, combination of elements, and arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below with reference to the appended drawings, in which.

Figure 1:
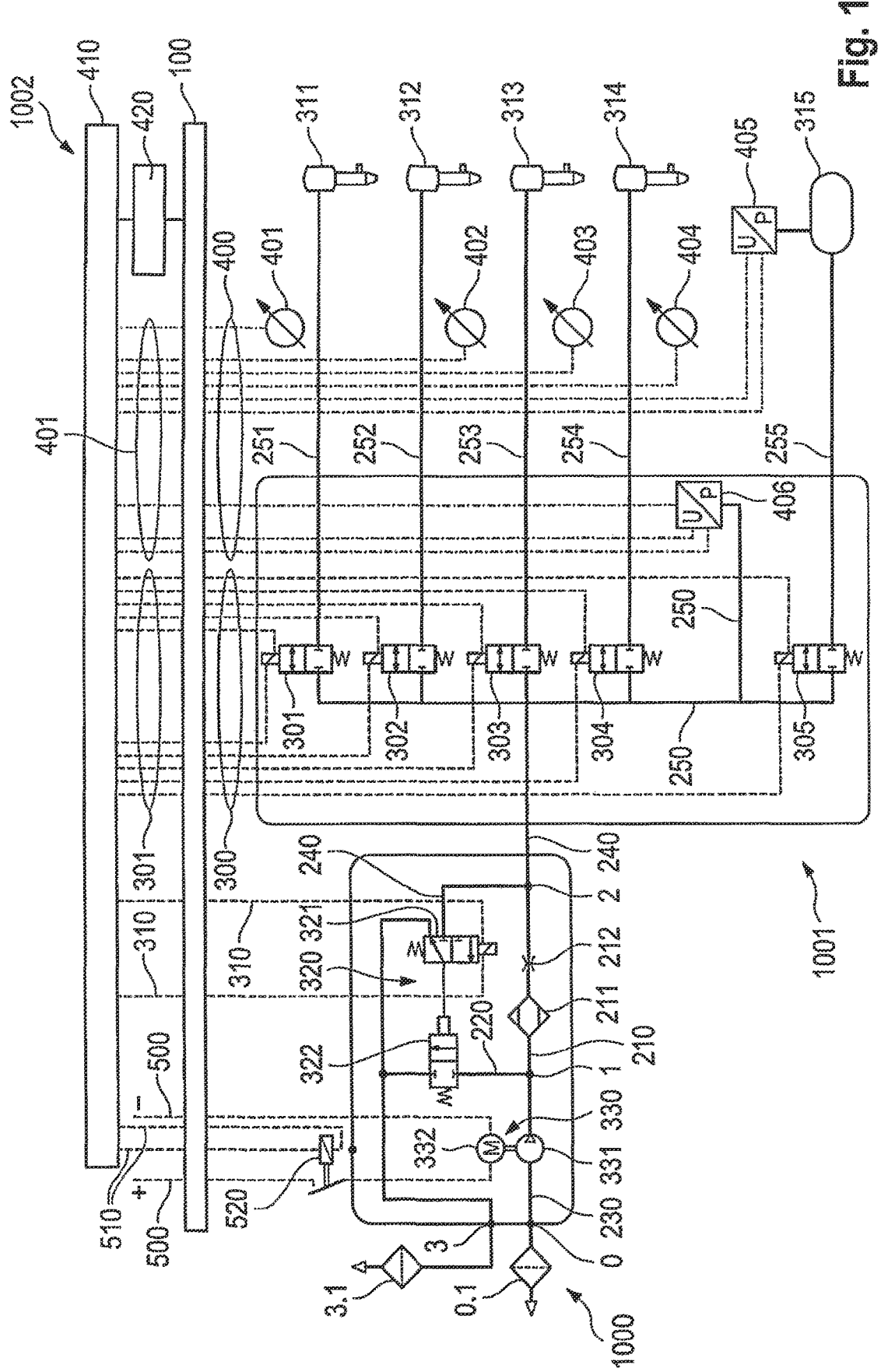
FIG. 1 is a circuit diagram of a compressed air supply facility according to an embodiment of the present invention.

LIST OF REFERENCE CHARACTERS 0.1 filter
0 air feed
1 compressed air feed
2 compressed air port
3 vent
3.1 venting damper etc.
10 drive shaft
11 tapered journal, first end
12 second end, tapered part of the drive shaft
13 thickened part of the drive shaft
14 rigid bearing journal 20 crankpin
21 crankpin flange of the crankpin
22 crankpin stub
23 balance weight
28 washer
29 screw
30 compressor housing, drive housing
31 housing wall, intermediate wall, dividing wall
31.1, 32.1 cylindrical protrusions as bearing seats
32 housing outer wall, motor housing wall, closure cap, housing closure
32.2 cantilever arm support holder, cantilever arm
32.3 first limb
32.4 second limb
33 housing part in the form of cylindrical ring
34 cover plate, covering plate
34.1 protrusion on the cover plate
40 motor
41 rotor flange, rotor journal
41.1 cantilever arm, cantilever arm section, supporting bell
42 rotor shell
42.1 offset section
50 bearing arrangement
51, 52, 53, 54 axle bearing
53 big end bearing
55 needle bearing
55.1, 55.2 cylindrical rollers, rolling elements
60 seal arrangement
61, 62, 63 seals
70 counter bearing piece
71 bearing journal
73 balance weight
80 cable harness
100, 100A, 100B, 100C, 100D, 100E, 100F onboard electrical system
102 motor housing part
210 pneumatic main line
211 air dryer
212 restrictor
220 vent line
230 feed line
240 pneumatic line
250 gallery
251, 252, 253, 254, 255 branch lines
300 control power lines
301, 302, 303, 304, 305 2/2-way valve
301, 401 signal lines
310 vent valve control power line
311, 312, 313, 314 air spring
315 compressed air reservoir
320 valve arrangement
321 control valve
322 vent valve
330 compressor
331 compressor element
332 electric motor
400 sensor lines
401, 402, 403, 404 sensors, signal lines
405, 406 voltage/pressure sensor
410 vehicle controller
420 vehicle bus
500 supply power line
510 relay control line
520 relay
1000 compressed air supply facility
1001 pneumatic facility
1002 compressed air supply system
1100 housing arrangement
1101 housing
1101A piston housing
1101B crankcase
1102 motor housing
1103 dryer and valve housing
1103A dryer housing
1103B control housing
1300 crank mechanism
1301 piston
1302 connecting rod, piston rod
1303 eccentric bearing, bearing opening
1304 eccentric shaft, crankshaft
1305 axle shaft, axle shaft
1400 drive of the crank mechanism
1410 stator
1411 stator winding
1412 yoke, armature with insulation star
1420 rotor
1421 permanent magnets
1422 rotor bell
1430 air gap or wound insulation
1440 supporting structure, holder
1450 air gap or wound insulation
1500 bearing arrangement
1501 A bearing, rolling bearing
1502 B bearing, rolling bearing
EA eccentric axis
MA motor axis

DETAILED DESCRIPTION OF THE PREFERRED EMBODIMENTS

FIG. 1 shows an exemplary compressed air supply facility 1000 designed to supply a pneumatic facility 1001 in the form of an air filtering facility of a motor car. The compressed air supply facility 1000 has a compressor arrangement having a compressor and a feed line 230 leading to the compressed air feed 1. Via the pneumatic feed line 230, ambient air can be drawn in via a filter 0.1 and an air feed 0 and fed to the compressor 330. For this purpose, the compressor 330 has a compressor element 331 driven by an electric motor 332. Connected to the compressed air feed 1 is a pneumatic main line 210 leading to the compressed air port 2, via which compressed air compressed by means of the compressor 330 can be fed to the pneumatic facility 1001. For this purpose, the pneumatic facility 1001 is connected to the compressed air port via another pneumatic line 240, which is connected to a gallery 250, from which, in turn, branch lines 251, 252, 253, 254, 255 emanate. 2/2-way valves 301, 302, 303, 304, 305 are arranged in the branch lines 251 to 255 in order to control feeding of the compressed air to a bellows of an air spring 311, 312, 313, 314 or a compressed air reservoir 315. Likewise connected to the gallery 250 is a voltage/pressure sensor 406 and a further voltage/pressure sensor 405 is connected directly to the compressed air reservoir 315. Respective displacement sensors 401, 402, 403, 404 for the front axle and the rear axle are assigned to the air springs or the associated 2/2-way valves 301 to 305.

The control state of the 2/2-way valves 301 to 305 can be set by means of control current lines 300, which are connected to an onboard electrical system 100 of the compressed air supply system 1002 and which are actuated by means of a vehicle controller or signal lines 301 emanating from the vehicle controller 410. Similarly, the sensors 401 to 406 are actuated by means of the vehicle controller 410 (ECU) via signal lines 401 and are supplied with current via sensor lines 400.

Signals on the signal lines 301, 401 are also made available to a vehicle bus 420, here, in the form of a CAN bus, for example.

The operation of the compressed air supply facility 1000 is as follows. Via a relay control line 510 between the vehicle controller 410 (ECU) and a relay 520 for controlling the compressor 330, the compressor is actuated in order to produce compressed air; for this purpose, the relay 520 is supplied with power via the power lines 500 and in accordance with the onboard electrical system 100. The compressed air available to the compressed air feed 1 is fed to the compressed air port 2 in the pneumatic main line 210 via an air dryer 211 and a restrictor 212 and is then made available as well to the gallery 250 of the pneumatic facility 1001 via the further pneumatic line 240.

To vent the pneumatic facility 1001 and/or the compressed air supply facility 1000 or pneumatic components thereof, compressed air can be passed in the opposite direction from the compressed air port 2, via the restrictor 212, regenerating the air dryer 211 in the pneumatic main line 210; here, further venting is accomplished by diverting the compressed air to be vented into a vent line 220 at the compressed air feed 1.

For this purpose, a pilot controlled vent valve 322 is actuated by a control pressure in the pneumatic control line 240 when the control valve 321 opens the pneumatic control line 240 to the actuating plunger of the vent valve 322. For this purpose, the control valve 321 can be controlled via a vent valve control power line 310, i.e., the solenoid thereof can be energized and transfers the control valve 321 from the first control position to the second control position counter to the spring force of a symbolically indicated spring of the control valve 321.

It should be understood that the compressed air supply system 1002 shown and described in FIG. 1 is being used purely by way of example to illustrate a fundamental mode of operation of a compressed air supply system in general and that many different modifications and changes to the subject matter are possible. For example, a pilot controlled check valve, which is not shown specifically in FIG. 1 in the present case, can also be provided in the pneumatic main line 210 as part of the valve arrangement 320 comprising the control valve 321 and the vent valve 322.

Independently of the abovementioned aspect, it is possible to operate different electrical and/or electronic components, especially on the onboard electrical system 100, instead of or in addition to the relay 520, especially in the context of the modifications and changes; embodiments of the present invention are explained in relation to this aspect. In particular, there is the possibility of various variants of an onboard electrical system that are advantageous for operating the compressor 330, that is, in this case, an electric motor 332 for operating the compressor element 331.

Figure 2:
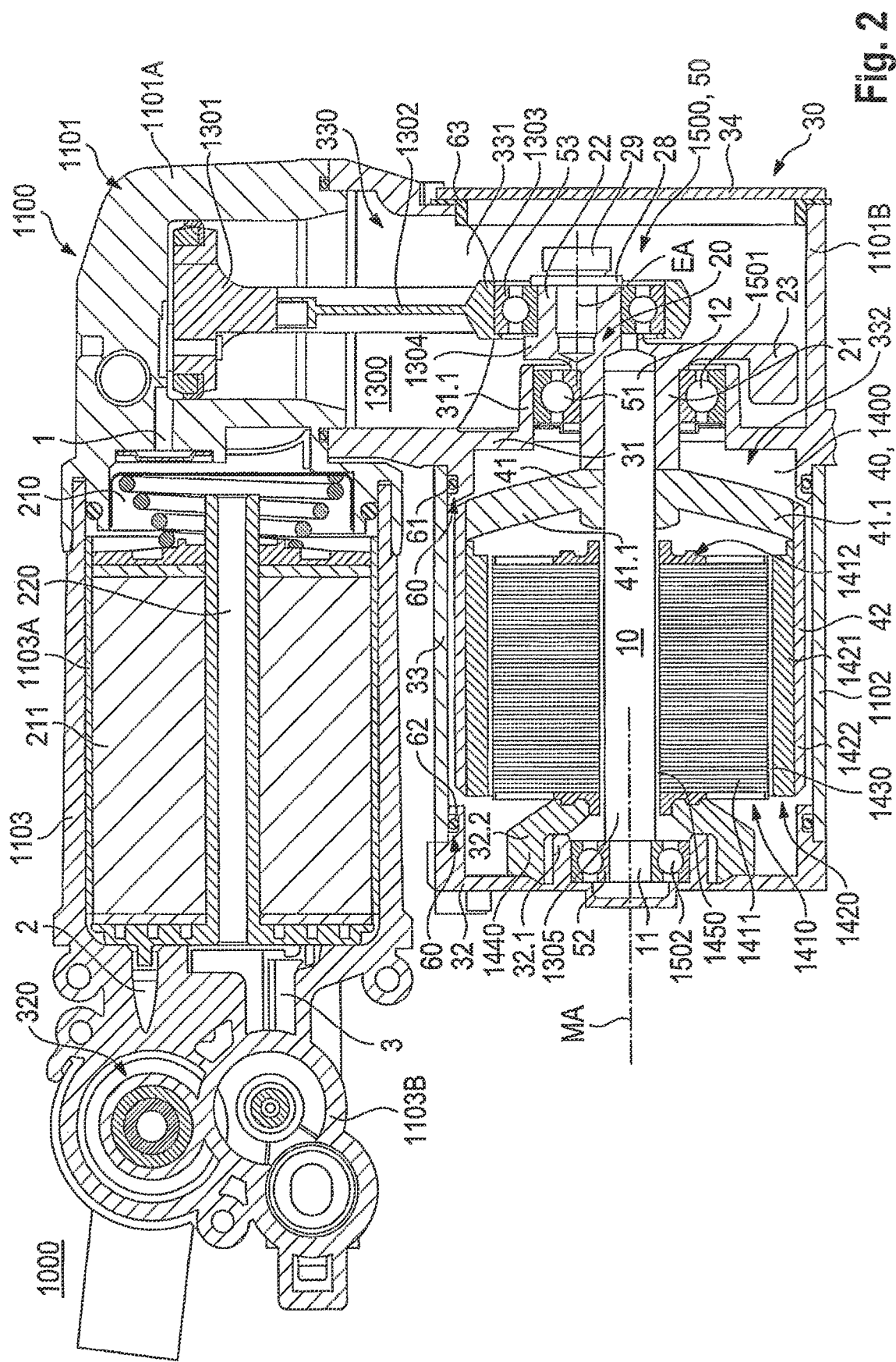
FIG. 2 shows a first embodiment of a compressed air supply facility according to the present invention having a first embodiment of a compressor arrangement having a motor in an integrated drive housing.

In the context of a first variant of a preferred embodiment, FIG. 2 shows a structural implementation of a compressed air supply facility 1000. For the sake of simplicity, the same reference signs are used for identical or similar features of features with the same or similar function as in the diagram of the compressed air supply facility 1000 in FIG. 1. In the drawings in FIG. 2 and FIG. 3 of a compressed air supply facility 1000 and in the schematic cutaway views of the motor housing 1102 and of the crankcase 1101B in FIG. 4 to FIG. 9, the abovementioned arrangements can be seen as follows.

In the drawing of the compressed air supply facility 1000 in FIG. 2, the housing arrangement 1100 thereof can be seen with a drive housing 30 for the purpose of embodying the compressor 330 comprising the compressor element 331 and the electric motor 332, wherein the drive 1400 in the form of an electronically commutated brushless electric motor 40—in this case a DC motor (BL-DC motor)—and the crank mechanism 1300 are accommodated in the drive housing 30.

For this purpose, the housing arrangement 1100 comprises a compressor-element housing 1101 for the compressor element 331 having a piston housing 1101A and a crankcase 1101B. Adjoining the crankcase 1101B of the compressor-element housing 1101 is a motor housing 1102 to form the electric motor 332. Adjoining the piston housing 1101A is a dryer and valve housing 1103 comprising the dryer housing 1103A—to form the air dryer 211—and the control housing 1103B comprising electrical and/or electronic and pneumatic interfaces together with a mechatronic system and an arrangement of valves—essentially to form the valve arrangement 320. As shown in FIG. 2, the valve arrangement 320 and the air dryer 211 with a system, designated in FIG. 1, of pneumatic lines—in particular comprising the pneumatic main line 210 and the vent line 220 between the compressed air feed 1 and the compressed air port 2 or vent port 3—are implemented in this way in the valve and dryer housing 1103.

In the piston housing 1101A, a reciprocating piston 1301 is held on a connecting rod 1302 of a crank mechanism 1300. The connecting rod 1302 itself, which is designed as a piston rod, is supported on a crankshaft (designated below) via a big end bearing, which is here designated as an eccentric shaft 1304 or eccentric bearing 1303 of the crank mechanism 1300.

The drive 1400, formed with the electric motor 332, for the crank mechanism 1300 and the crank mechanism 1300 are substantially accommodated in the motor housing 1102 and the crankcase 1101B. To form the electric motor 332, the drive 1400 itself has a stator 1410 having a stator winding 1411 on an armature 1412 or similar yoke—in this case a laminated core. Moreover, the drive 1400 has a rotor 1420 having a rotor bell 1422 and an arrangement of permanent magnets 1421 mounted thereon. Here, the rotor bell 1422 comprises at least one rotor flange 41, a cantilever arm section 41.1 to form a cantilever dome and a rotor shell 42, in this case cylindrical, attached integrally thereto or in engagement therewith.

To form the motor 332 in the form of an external rotor motor for the drive 1400, the stator 1410 is held in the rotor 1420 while being separated by an air gap 1430 and is surrounded rotatably by the rotor 1420. Here, the rotor 1420 is held on an axle shaft 1305 and held so as to be rotatable therewith, while the stator 1410 is held by a supporting structure 1440. The rotatable axle shaft 1305 and crankshaft 1304 as well as the connecting rod 1302 form the essential power-transmitting elements of the crank mechanism 1300 driven by the drive 1400, wherein these elements are held in a bearing assembly 1500. The bearing assembly 1500 comprises an A bearing 1501, a B bearing 1502 and an eccentric bearing 1303 for the performance of a rotary motion by the axle shaft 1305 or crankshaft 1304 and a reciprocating motion of the connecting rod 1302. In this connection, the parts of the crank mechanism 1300, of the bearing assembly 1500 and of the holder 1440 or the rotor 1420 and of the drive housing 30—i.e., the motor housing 1102 and the crankcase 1101B—are described below in greater detail using the reference signs, which also apply to FIGS. 3 to 9.

The axle shaft 1305, which is embodied as a drive shaft 10, is arranged so as to be centered with respect to a motor axis MA and held rotatably in the stator 1410, namely, by means of the rolling bearings 1502, 1501, which are here referred to as axle bearings 51, 52 of the bearing arrangement 50. More specifically, the drive shaft 10 is held directly in a rotating manner in the second axle bearing 52 (B bearing) on a tapered journal 11 on the housing closure side and, at its untapered and, if appropriate, thickened second end 12 carries a crankpin 20 for the formation of the crankshaft 1304. The crankpin 20 is fixed frictionally and/or positively by means of an interference fit on the drive shaft 10 and is rotatable with the drive shaft 10. The crankpin 20, in turn, is held directly in a rotatable manner in the first axle bearing 51 (A bearing), with the result that the drive shaft 10 is supported indirectly in the first axle bearing 51 via the crankpin 20. The first axle bearing 51 and the second axle bearing 52 are arranged within the motor housing 1102, wherein the first axle bearing 51 is held in a centered manner in a first housing wall 31, which adjoins the crankcase 1101B or is formed as part thereof, and the second axle bearing 52 is held in a centered manner in a housing outer wall 32 of the motor housing 1102, the wall being situated opposite the output side. The housing outer wall 32 is in the form of a closure cap for the motor housing toward the outside of the motor housing. The first housing wall 131 is formed as part of the crankcase 1101B, wherein a housing part 33 in the form of an annular cylinder is connected to the first housing wall 31, onto which or into which part the housing cap is placed. Via the crankcase 1101B there is in turn access to the crank mechanism 1300, namely, via the housing cover plate 34 mounted on the output side in the crankcase 1101B, approximately as an extension of the motor axis MA. Inserted between the closure cap 32 and the cylindrical motor housing part 33 and between the latter and the first housing wall 31 and between the housing cover plate 34 and the remaining part of the crankcase 1101B there is, in each case, a seal, in particular in the form of a ring seal or lip-type ring seal 61, 62, 63, with the result that the motor housing 1102 and the crankcase 1101B—here referred to as drive housing 30—are closed off in an airtight and liquid-tight manner by the seal arrangement 60 comprising seals 61, 62, 63.

The first and the second axle bearing 51, 52 are fixed centrally with respect to the motor axis MA in cylindrical protrusions 31.1 and 32.1 on the first and second housing walls 31, 32, into which the axle bearings 51, 52 are inserted. Taking into account also the seals 61, 62 as damping elements, the first and the second housing wall 31, 32 thus advantageously serve to hold the drive shaft 10 in a centered manner by means of the first and second axle bearings 51, 52 and with a certain vibration damping.

Moreover, adjacent to the crankpin 20 mounted on the first end 11, the drive shaft 10 carries a rotor flange 41 of approximately V-shaped cross section, on which a cantilever arm section 41.1 in the form of a cantilever dome is formed to form an approximately V-shaped cantilever, the section being cylindrical and extending approximately transversely to a motor axis MA of the drive shaft in cross section. A cylindrical body, a rotor shell 42, which is cylindrical and shown as a first and a second limb parallel to the motor axis MA in cross section, is, in turn, connected to the cantilever arm section 41.1 to form the rotor bell 1422, on which, in turn, the arrangement of permanent magnets 1421 is mounted. The rotor flange 41 can be mounted by means of an interference fit on the first end 11 of the drive shaft 10, like the crankpin flange 21 of the crankpin 20. In a modification, the connections, flanges 21, 41 with an interference fit, can also be embodied as an integral connection to the drive shaft 10—in other words, the drive shaft 10 can be formed integrally with the flanges 21, 41 and, if appropriate, the adjoining cantilever arm section 41.1 and, if appropriate, the rotor shell 42 and/or crankpin 20.

The crankpin 20 has a crankpin base 22, which is centered eccentrically on an eccentric axis EA, and a balance weight 23, which is situated opposite the base in relation to the motor axis MA, with the result that the unbalance of the crankpin base 22 and of the balance weight 23 balance each other out approximately during rotary actuation of the crankpin 20—this also approximately takes into account the weight of a screw 29 in crankpin stub 22, the screw holding a big end bearing 53 of the bearing arrangement 50 on the crankpin stub 22 when tightened, exerting pressure on a washer 28. The connecting rod 1302 is supported on the big end bearing 53 on a bearing opening 1303 of a lug or the like. The bearing arrangement 50 of the first and the second axle bearing 51, 52 and of the big end bearing 53 provides for the alignment of the first axle bearing 51 and of the big end bearing 53 on the crankpin 20—the first axle bearing 51 on the crankpin flange 21 and the big end bearing 53 on the crankpin stub 22—such that they are arranged directly adjacent to one another; these being associated with the first end 11 of the drive shaft 10 on the output side of the motor 40. The second axle bearing 52 (B bearing) is associated with the second end 12 of the drive shaft 10, the end situated opposite the output side. Both the first and the second axle bearing 51, 52 are arranged outside the stator 1410 and also outside the rotor 1420 of the drive 1400 and therefore are situated outside the extent of the rotor shell 42—as seen relative to an extent of the motor axis MA. This has advantages, in particular, as regards the stability of support for the drive shaft 10 since the drive shaft is supported at its end points, namely, at the outermost end of the first end 11 of the drive shaft 10 and at the outermost end of the second end 12 of the drive shaft 10. Moreover, wow and flutter during the rotary actuation of the drive shaft 10 and the crankpin 20 are kept relatively small owing to a close proximity of the first axle bearing 51 and big end bearing 53 and of the mutually opposite moments of weight of the balance weight 23 and of the crankpin stud 22.

Installation of the first axle bearing 51 and the big end bearing 53 with the components adjoining them can be effected via a housing cover plate 34 in the crankcase 1101B. Installation of the second axle bearing 52 can be effected by removing the housing cap 32 on the motor-side cylindrical part 33 of the drive housing 30. The cantilever arm support holder 32.2, which can support structure 1440, also adjoins the housing cap 32. The cantilever arm support holder 32.2 for supporting the stator 1410 is formed concentrically around the cylindrical protrusion 32.1 on the housing cap 32 and fits over the protrusion in the direction of the motor axis MA while leaving an air gap 1450 between the drive shaft 10 and the cantilever arm structure 1440.

The housing cover toward the outside of the motor housing 1102 is thus constructed in the form of a bearing shield in order, on the one hand, to serve as a bearing receptacle for the second axle bearing 52 and, on the other hand, for the mounting of the cantilever arm structure 1440.

Figure 4:
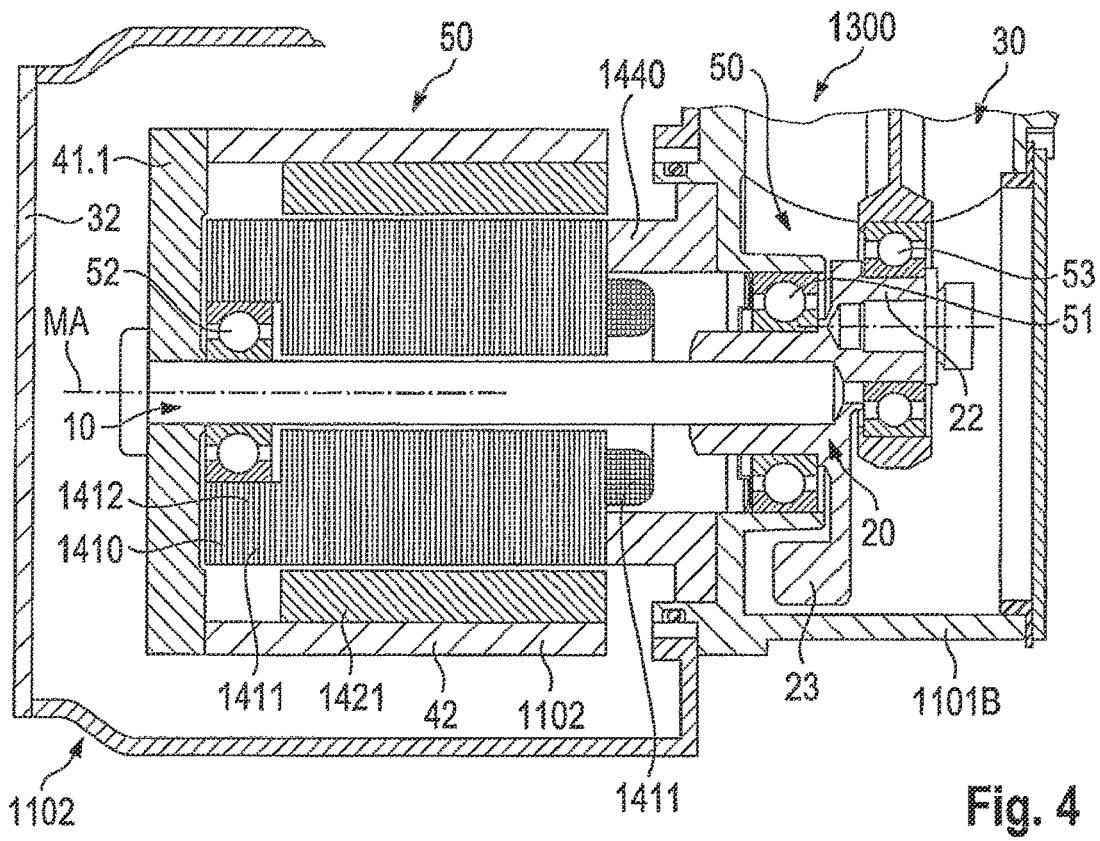
FIG. 4 is a schematically illustrated cutaway view of a combined motor housing and crankcase forming an integrated drive housing for a modified compressor arrangement on the basis of FIG. 3.

In an embodiment, the second axle bearing 52 can be brought closer to the stator 1410, in particular, it can be accommodated in the yoke 1412 or laminated core and the winding 1411, i.e., in the installation space for these (e.g., as shown schematically in FIG. 4). It is also possible, in another embodiment, for the first axle bearing 51 to be filled such that the rotor flange 41 of the cantilever arm section 41.1, in particular the rotor shell 42, is formed to be combined with the crankpin flange 21 of the crankpin 20 or to be integral therewith or to come to rest thereon. Both embodiments lead to shortening of the overall length along the extent of the drive shaft 10 because the installation space for the first and the second axle bearing 51, 52 in the axial direction is reduced to the installation space for the rotor flange 41 and crankpin flange 21 and/or for the stator 1410.

Figure 3:
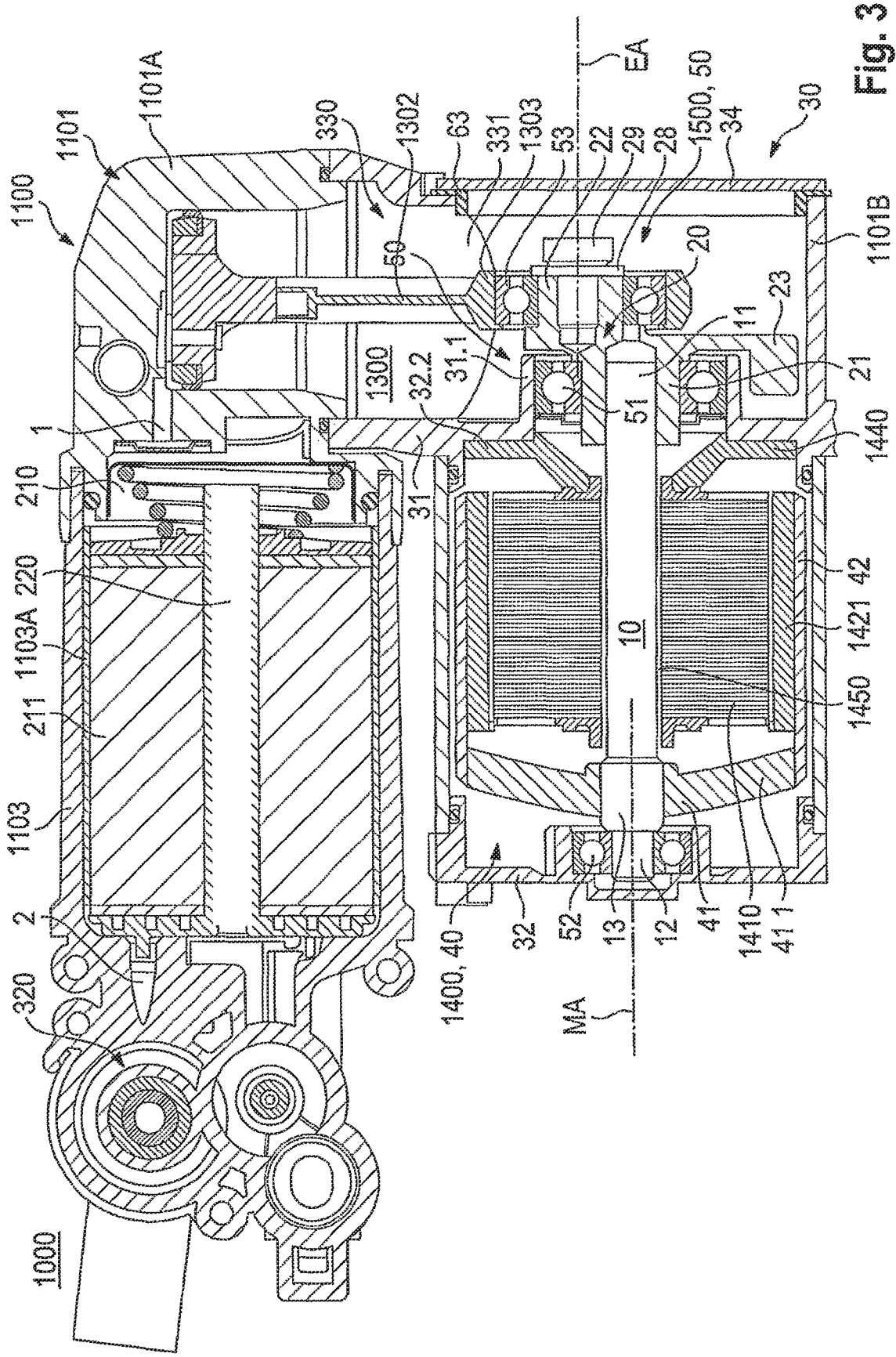
FIG. 3 shows a second embodiment of a compressed air supply facility having a second compressor arrangement having a motor in an integrated drive housing.

In all the foregoing cases, the exemplary construction shown in FIG. 2 and also that shown in FIG. 3 offer effective protection of rotor 1420 from contact and contamination from outside, and the capability to encapsulate the entire motor in a manner that meets EMC requirements. In the case of the structural design shown in FIG. 2 and FIG. 3, the armature 1412 or the laminated core associated therewith as well as the stator winding 1411 no longer necessarily have to be designed to absorb bearing forces. This eliminates impairment of the magnetic flux through bearing apertures in the laminated core of the armature 1412. On the contrary, the required bearing forces for the bearing arrangement 50 are entirely absorbed in the drive housing 30. This structural embodiment also offers the capability to size the axle bearings 51, 52, 53, 54 in an improved way since it is no longer limited by the stator 1410, in particular, it is no longer limited to the installation space for the yoke 1412 and the stator winding 1411. As a result, the rotor 1420 design is optimized for the ratio of mass to moment of inertia. This avoids wow and flutter, exploiting the relatively high moment of inertia of the rotor 1420 with the structural design of rotor shell 42.

Overall, significantly improved efficiency of the compressor 330, especially of the electric motor 332, is obtained. The overall efficiency of the compressed air supply facility 1000 is thereby improved to a considerable degree. Also contributing to this is a significantly improved power to weight ratio with a considerably reduced installation space volume. Increases in power of up to five times that of previous brush-fitted motors at the rated voltage are possible. Eliminating the wear of the carbon as compared with the brush-fitted motor results in a significantly extended life for the brushless motor, and this is achieved without the risk of contamination of the compressor 330 and of the dryer 211 due to brush abrasion.

Using a control circuit, in the mechatronic part of the compressed air supply facility 1000 or, alternatively, externally with respect thereto—in particular an electronic control circuit for electronic commutation of the brushless motor and/or speed adjustment in the pressure control mode and/or for implementing a soft startup control regime and/or for adapting an onboard electrical voltage—it is possible to control the motor synergistically, i.e., at neutral cost with multiple functions. In this way, for example, it is possible, using the electric motor 332, to intensify specified speed changes of up to 100 rpm over the charging process. In this case, such a speed can be set independently of a supply voltage of the onboard electrical system. Overall, smooth running is obtained, even at relatively low speeds. In all cases, the starting behavior can be influenced in an effective manner by means of suitable controllers.

Moreover, the embodiment shown in FIG. 2 has the advantage that it is compatible with a large number of housing arrangements 1101A, 1103 of a piston housing or dryer.

FIG. 3 shows another variant of an embodiment of a compressed air supply facility 1000, in which, given the identical embodiment of the dryer housing 1103 and of the piston housing 1101A, the same reference signs identify identical parts or features or parts with an identical or similar function. In particular, attention is drawn to the description of FIG. 2. It is therefore primarily the differences between the variants of the compressor arrangement that are discussed below.

In this connection, FIG. 3 furthermore shows the crank mechanism 1300 and the drive 1400 with the electric motor 40 and the compressor housing 30. Attention is drawn once again to the drive shaft 10 having a first end 11 and a second end 12 and axle bearings 51, 52 mounted thereon, the latter directly and the former via the crankpin flange 21 of the crankpin 20, on which the big end bearing 53 of the bearing arrangement is mounted. To this extent, the variant shown in FIG. 3 likewise provides an external arrangement of the axle bearings 51, 52 on the outermost end of the drive shaft 10 and also approximately the same embodiment of a transmission between the drive shaft 10 and the crankpin 20 with the first axle bearing 51 and big end bearing 53.

In this case, however, the holder for the stator 1410 is associated with the output-side part of the motor 40, while the mounting of the rotor flange 41 is initially adjacent to the outward-facing housing closure 32. Thus, the axial arrangement of the stator 1410 and of the rotor 1420 is mirror-symmetrical about a plane perpendicular to the motor axis MA. The rotor flange 41 and the crankpin flange 21 are now spaced apart by the stator 1410. The rotor flange 41 is mounted directly adjacent to the second axle bearing 52 on a thickened part 13 of the drive shaft 10, which directly adjoins the tapered end part 12 of the drive shaft. The open side of the rotor shell 42 faces in the direction of the output side of the motor 40, while the cantilever arm dome 41.1 of the rotor 1420 approximately follows the curvature of the housing closure 32. This provides improved shielding of the motor parts from the outside environment in addition to the housing cap 32. In contrast to the variant shown in FIG. 2, the approximately V-shaped supporting structure 1440 for the stator 1410 with the cylindrical cantilever arm support 32.2 is now mounted not on the housing cap 32 but on the intermediate wall 31 of the crankcase 1101B. This has the advantage that what may be a heavy load of the stator 1410 is secured on a relatively stable housing part. Moreover, the motor 40 can be built in a relatively simple manner via an open housing cap 32 by inserting the first axle bearing 51 into the housing protrusion 31.1, after which the cantilever arm support 32.2 is attached while mounting the stator 1410, and the rotor shell 42 with the permanent magnets 1421 is then attached, with the rotor flange 41 being mounted on the drive shaft 10. Finally, the second axle bearing 52 is mounted with the housing cap 32. The big end bearing 53 can be mounted via the housing cover plate 34 of the crankcase 1101B. Fundamentally, this or a similar arrangement has an effect on torsional vibration behavior; in particular, torsional damping may be expedient in this connection. A fixed and/or floating bearing assembly is preferably provided so that as small a change in position as possible at the big end bearing has to be accepted in the case of heat-induced distortion. A support bearing assembly is possible in principle. However, torque transmission in accordance with the design in FIG. 3—via a relatively long shaft—and in accordance with the design in FIG. 2—via a relatively short shaft—is fundamentally advantageous. In the case of a short shaft, it is advantageously possible, in a modification, for the flange of the rotor bell and the crankshaft to be embodied as a single component.

FIG. 4 shows the drive housing 30 with the crankcase 1101B and motor housing 1102, and the crank mechanism 1300 with drive shaft 10 and crankpin 20 as described with reference to FIG. 2 and FIG. 3. As regards the big end bearing 53 and the first axle bearing 51, the bearing arrangement 50 is embodied as in FIG. 2 and FIG. 3. The second axle bearing 52 is arranged on the drive shaft 10 within the rotor shell 42 of the rotor 1420 and in the stator 1410, namely, being integrated in the laminated core of the armature 1412 for the winding 1411. The motor housing 1102 is closed by means of the housing cap 32 and can be embodied in a simplified way without the protrusion 32.1, since the second axle bearing 52 is held in the stator 1410.

Figure 5:
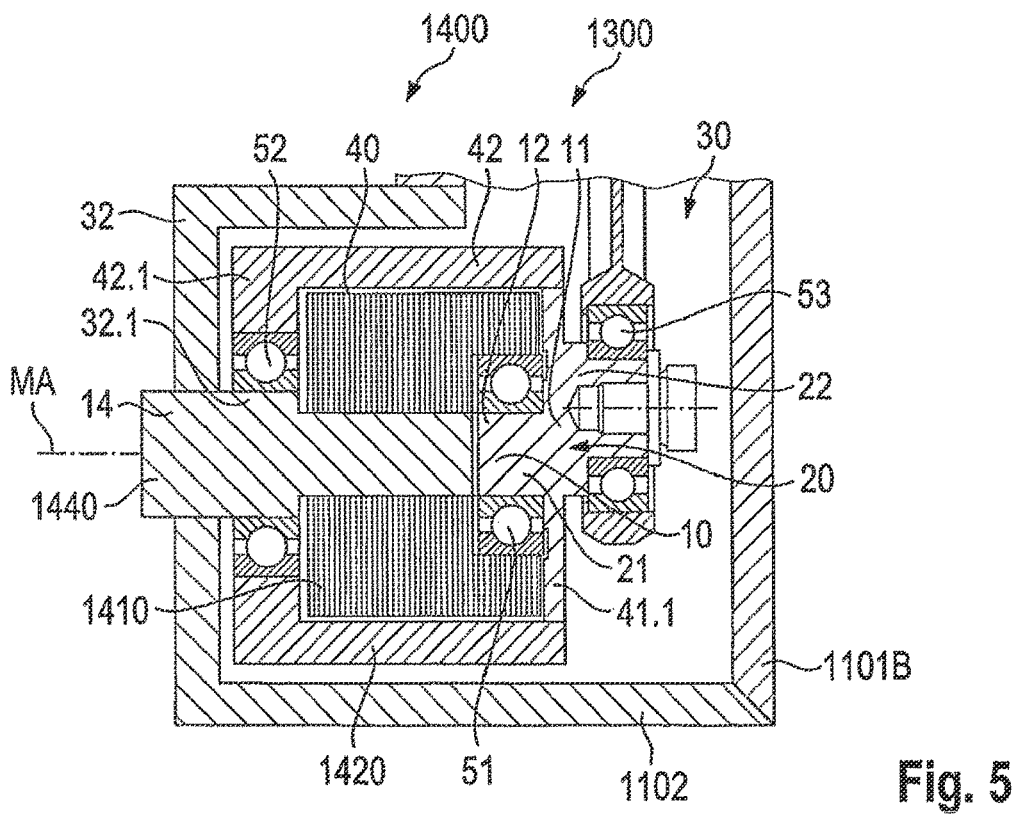
FIG. 5 is a schematically illustrated cutaway view of a combined motor housing and crankcase forming an integrated drive housing for a compressor arrangement modified further in relation to FIG. 4.

FIG. 5 shows another modification wherein the crank mechanism 1300 is embodied as described above in the drive housing 30. In the present case of the motor 40 for the formation of the drive 1400, the stator 1410 is embodied substantially as described in FIG. 2, wherein the rotor 1420 is aligned as described in FIG. 2. The crankpin flange 21 of the crankpin 20 carries both the first axle bearing 51 and the supporting bell 41.1 of the rotor to form the rotor shell 42. At its end adjacent to the second end 12 of the drive shaft 10, the rotor shell 42 has an offset section 42.1—in this case an annular section—which is supported on the second axle bearing 52. The second axle bearing 52 is in turn fixed on a cylindrical protrusion 32.1 on the housing cap 32 of the motor housing 1102. The first axle bearing 51 is accommodated in the installation space for the stator 1410 (similar to the second axle bearing in accordance with the construction shown in FIG. 4). Together with the rotor shell 42, the rotor 1420, which is held on the drive shaft 10 by means of the rotor flange 41, is thus supported on the second axle bearing 52 at the end opposite the supporting bell 41.1 by means of the offset section 42.1.

In the modification of the embodiment in FIG. 2, which is shown in FIG. 5, the rigid bearing journal 14 is, in turn, of hollow design and is capable of accommodating a cable guide in the cavity. This is optional. Overall, the drive shaft 10 in accordance with the construction shown in FIG. 5 can be held with relatively little torsional loading. Support is provided via the rotor shell 42 on the offset section 42.1—in this case an annular section—or on the rotor flange 41 while involving the crankpin 20. In contrast, the rotor shell 42 can be embodied with a suitably configured weight distribution—e.g., through configuration of the offset section 42.1 and/or of the cantilever arm 41.1—such that a balance weight 23 on the crankpin 20 (as in the embodiments in FIG. 2 to FIG. 4) becomes unnecessary. That is, a balance weight is implemented by means of a suitable weight distribution on the rotor shell 42. For example, the offset section 42.1 and/or, as a particularly advantageous option, or the cantilever arm 41.1 situated closer to the crankpin 20, can be provided with a different weight on different sides of the motor axis MA, e.g., by thickening or making holes or taking similar material-modifying measures. Such a measure on the cantilever arm 41.1 is particularly conducive to the avoidance of a wobbling motion of the rotor shell 42 since a balance weight is then positioned relatively close to the origin of the unbalance, namely, the connecting rods 1302. Moreover, the construction shown in FIG. 3 is distinguished by a particularly short installation space requirement in the direction of the motor axis MA. This is because, on the one hand, the first axle bearing 51 is integrated in the stator 1410 and is implemented on the crankpin 20, incorporating the rotor journal 41 or supporting bell 41.1. On the other hand, the second axle bearing 52 is likewise implemented directly on the rotor 1410, namely, on an offset section 42.1 of the rotor shell 42. The construction shown in FIG. 5 thus implements the as yet shortest structural form while relieving the drive shaft 10 of torsional load; the construction thus follows a principal of reducing the installation space requirements, whereas the embodiments shown in FIG. 2 and FIG. 3 provide relatively stable support for the drive shaft 10, i.e., support implemented over as long as possible a distance; this being at the expense of the installation space requirements. As the construction shown in FIG. 4 illustrates, it is possible to make a compromise between the fundamental principles in FIG. 2 and FIG. 3, on the one hand, and those in FIG. 5, on the other hand, while weighing up the installation space requirements and stability and torsional requirements on a drive shaft. The lower the torsional requirements on the shaft 10, the lighter the drive shaft 10 can be made and the smaller its diameter can be. Thus, it is possible for the embodiments in FIG. 2 to FIG. 5 to include drive shafts having diameters less than 15 mm. With a view to relieving the load on the drive shaft 10, it is possible for the diameter to be reduced even further, e.g., to a diameter of less than 12 mm, in particular less than 10 mm, this preferably being the case with the exemplary construction shown in FIG. 5.

Figure 6:
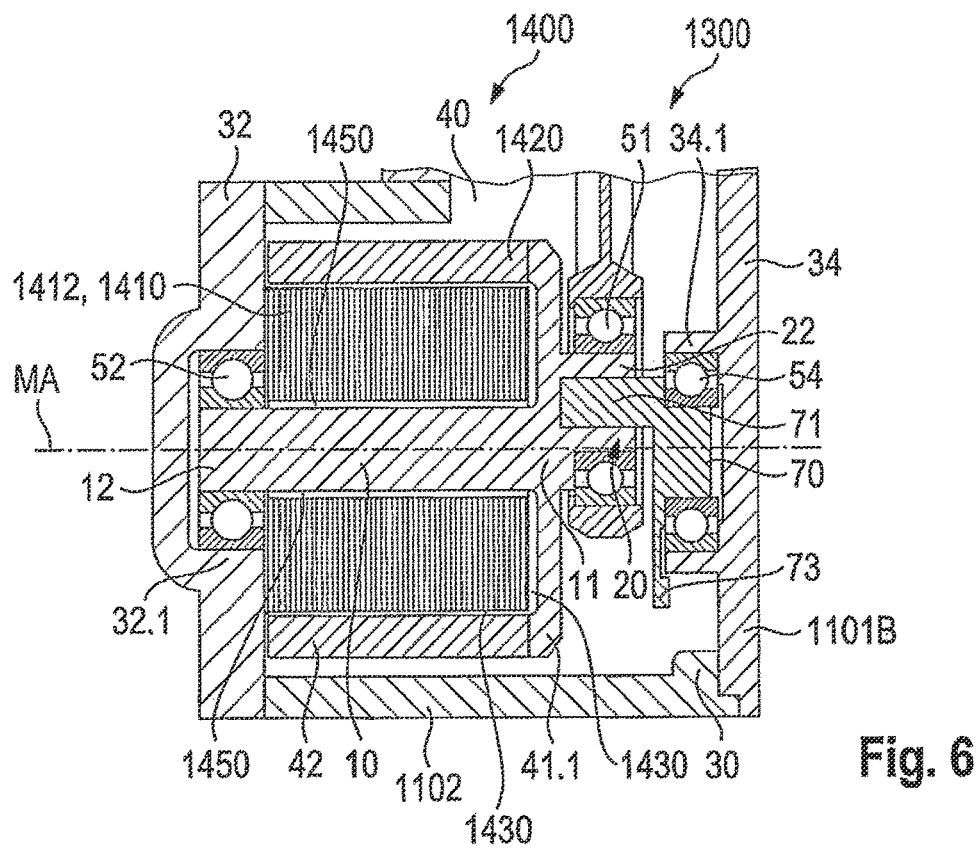
FIG. 6 is a schematically illustrated cutaway view of a combined motor housing and crankcase forming an integrated drive housing for a modified compressor arrangement on the basis of FIG. 2.

FIG. 6 shows another embodiment of drive 1400 in combination with crank mechanism 1300, which is based on the embodiment shown in FIG. 2. As in FIG. 6, the embodiment of the motor 40 is shown schematically and implemented largely in accordance with the construction shown in FIG. 2. However, in FIG. 6 the first, drive-side end 11 of the drive shaft 10, the supporting bell 41.1 and the rotor shell 42 are of integral design. As an alternative, the drive shaft can be of integral design with the supporting bell 41.1 and the rotor shell 42 with the permanent magnets can be mounted thereon. In both cases, the permanent magnets can be mounted separately to an integral cylindrical part of the rotor shell 42. The integral cylindrical part can be formed integrally with the drive shaft 10 and the supporting bell 41.1 or can be made available as a separate part and assembled. The construction shown in FIG. 6 optimizes a relatively sustainable support arrangement for the drive shaft 10, which, being embodied integrally with the crankpin 20, is provided with counter support by a counter bearing piece 70 fixed rotatably on the crankpin. For this purpose, the counter bearing piece 70 engages by means of a bearing journal 71 in the crankpin stub 22 and furthermore has a balance weight 73. The counter bearing piece 70 is then supported in the counter axle bearing 54, wherein the counter axle bearing 54 is held on the housing cover plate 34 of the crankcase 1101B; namely, in a protrusion 34.1 on the housing cover plate 34. A relatively short installation space is achieved since the support for the drive shaft 10 by means of the first and the second axle bearing 51, 52 extends over the entire installation space of the motor housing 1102 and crankcase 1101B, which nevertheless leads to reliable support for the drive shaft—however, the drive housing 30 can be embodied as a single housing space comprising the crankcase 1101B and the motor housing 1102, wherein a dividing wall 31 between the housing parts is no longer provided.

Moreover, the construction shown in FIG. 6 also offers the advantages of the possibilities, described by means of FIG. 5, of implementing a balance weight on the rotor or on the rotor shell 42—this is evident from the smaller size of the balance weight 73 on the counter bearing piece 70. However, it is possible to achieve the integration of the drive 40 with the crank mechanism 1300 in a single housing 30 without further incorporation of a dividing wall. The integral embodiment of the drive shaft 10 with the crankpin stub 20 and the rotor shell 42 to form the driving component is advantageous in the construction shown in FIG. 6.

Figure 7:
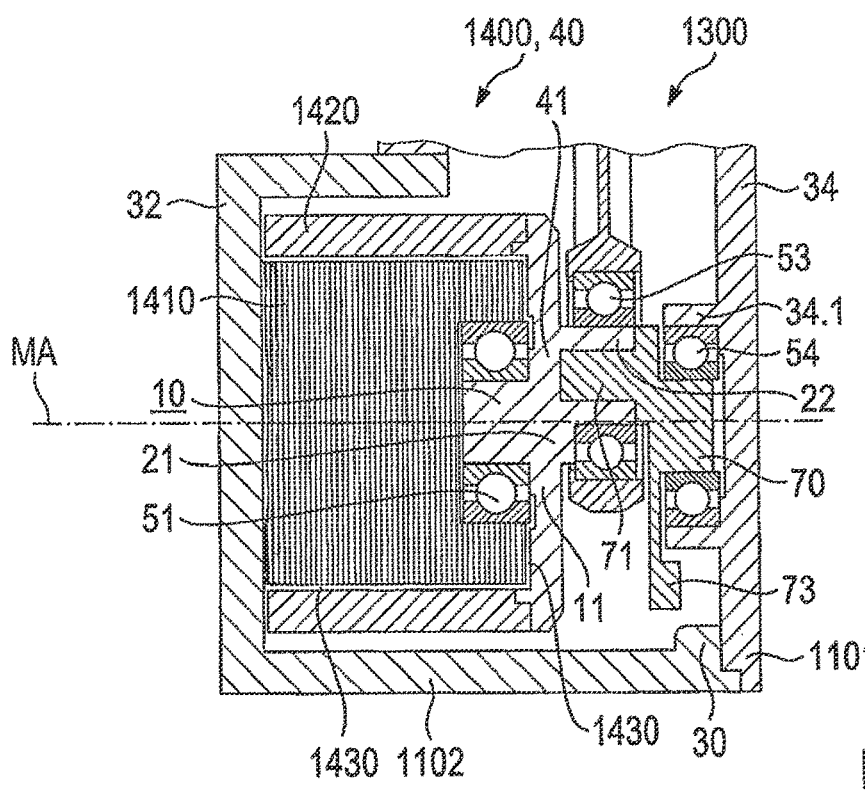
FIG. 7 is a schematically illustrated cutaway view of a combined motor housing and crankcase forming an integrated drive housing for a compressor arrangement modified further in relation to FIG. 6, in particular having a modified bearing arrangement for the drive shaft and the crankshaft and in relation to an embodiment of the crankshaft having a balance weight.

The embodiment shown in FIG. 7, which is based on the construction shown in FIG. 2, is embodied substantially in the same way as the construction shown in FIG. 6 as regards the crank mechanism 1300 while retaining the bearing piece 70 attached to a crankpin stub 22. A second axle bearing 52 held in a housing cap 32 is omitted, and hence there is no need to provide a separately removable housing cover on the housing 30, particularly on the outside of the motor. On the contrary, the housing 30 is now embodied as a drive housing, integrating the motor housing 1102 and the crankcase 1101B as an overall housing for the drive 1400 and the crank mechanism 1300, and all that is required is to open this on one side; here, this is implemented by means of the housing cover plate 34 and the protrusion 34.1. The counter axle bearing 54 for supporting the bearing part 70 is held in the protrusion 34.1 on the housing cover plate 34. The drive shaft 10, which is embodied in a substantially shortened way—thus being reduced to the part of a crankpin stub flange 21 or rotor flange 41 on the first end 11 of the drive shaft 10, the part now being integral and coinciding—is held in a first axle bearing 51 arranged directly adjacent to the big end bearing 53.

Figure 8:
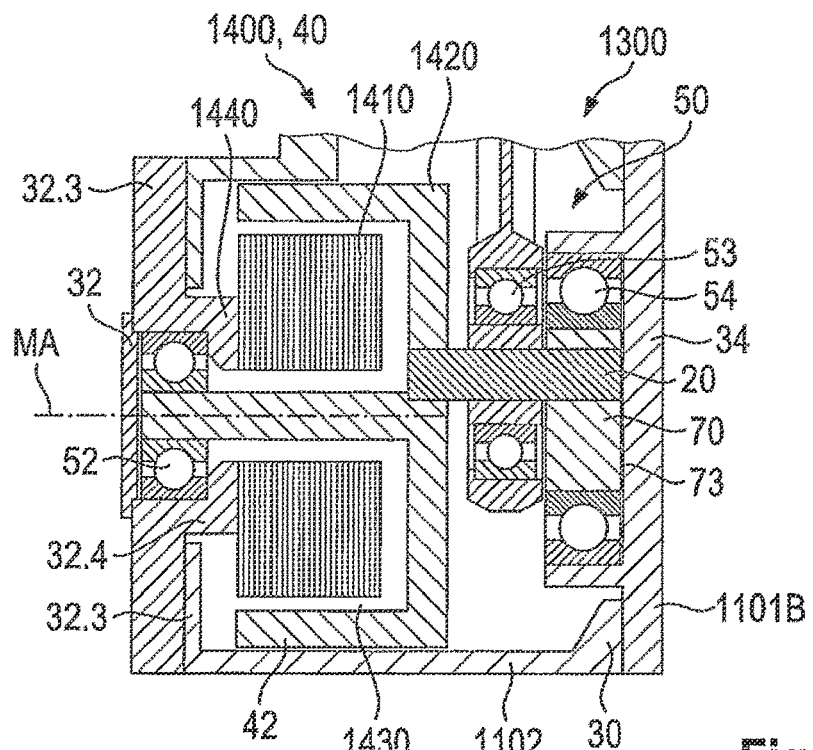
FIG. 8 is a schematically illustrated cutaway view of a combined motor housing and crankcase forming an integrated drive housing for a compressor arrangement modified further in relation to FIG. 6, in particular having a modified holding arrangement for a bearing and holding arrangement for a stator.

In summary, the embodiments in FIG. 6 to FIG. 8 contemplate the replacement of the first axle bearing 51 by a further counter axle bearing 54, which is held on the housing cover plate 34 of the housing 30, namely the previous crankcase 1101B, wherein the second axle bearing 52 is retained. The construction shown in FIG. 7 contemplates the replacement of the second axle bearing 52 by the further counter axle bearing 54, wherein the first axle bearing 51 is retained. Thus, by means of the construction shown in FIG. 7, what is probably the most compact design for a drive 1400 having a crank mechanism 1300 is obtained, involving the integration of the previous crankcase 1101B and the motor housing 1102 in a single drive housing 30 having a housing cover plate 34.

The embodiment shown in FIG. 8 adopts substantially analogous measures to those in the embodiment in FIG. 6. In particular, this relates to the embodiment of the bearing arrangement 50 with the second axle bearing 52, big end bearing 53 and further counter axle bearing 54. However, in FIG. 8, the balance weight 73 is embodied on the counter bearing piece 70 within the further bearing 54; thus, the counter bearing piece is embodied in an eccentric way. The second axle bearing 52 is now arranged so as to rest on the housing cap 32, wherein the housing cap 32 is embodied so as to be shortened transversely to the motor axis. The latter measure is implemented in favor of a modified stator holder 1440 for the stator 1410, which now extends transversely to the motor axis MA along a radius from a circumference radially on the outside to the radial circumference of the second axle bearing and then reaches through to the stator 1410 along the motor axis in order to hold a yoke of the stator with the armature winding. Thus, the stator holder has a first limb 32.3 and a second limb 32.4, which essentially assumes the function of the cantilever arm designated by 32.2 in FIG. 2. The first limb 32.3 is fixed on a cylindrical part of the motor housing 1102. As regards the saving of installation space, the embodiment shown in FIG. 8 achieves values similar to the embodiment of FIG. 7 since an additional space requirement for the second axle bearing 52 is eliminated as compared with the embodiment of FIG. 6. As is apparent from FIG. 8, the second axle bearing 52 is integrated with the stator holder 1440 in the installation space for the stator 1410 and nevertheless achieves effective utilization of the installation space for the motor 40 since the rotor shell 42 can extend virtually to the stator holder 1440 along the motor axis MA. Once again, integration is accomplished in a common housing 30 formed by a motor housing part 102 and a crankcase part 1101B.

Figure 9:
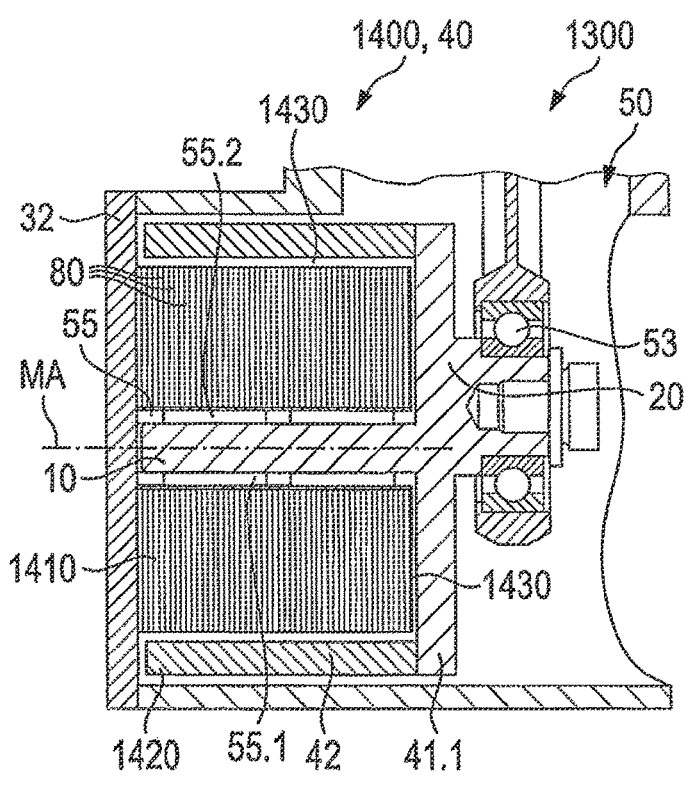
FIG. 9 is a schematically illustrated cutaway view of a combined motor housing and crankcase forming an integrated drive housing for a compressor arrangement according to another embodiment of the present invention.

FIG. 9 shows another embodiment of a crank mechanism 1300 and of a drive 1400 having a motor 40, wherein the same reference numbers are used for identical or similar parts or parts having the same or a similar function. In the embodiment shown in FIG. 9, similar to the embodiments in FIG. 6 to FIG. 8, the drive shaft 10 is integral with crankpin 20 and supporting bell 41.1, and, if appropriate, also with the rotor shell 42. The fundamental arrangement corresponds to the arrangement of the rotor and stator based on the construction shown in FIG. 2, being quite similar to that already described in connection with FIG. 6 to FIG. 8. The bearing arrangement 50 now consists of the big end bearing 53 and—while omitting the first and second or further axle bearings—a needle bearing 55. The needle bearing 55 is a rolling bearing with a low profile. The rolling elements resemble needles in the form of relatively thin and very long cylindrical rollers 55.1, 55.2. The needle bearing 55, having two rolling elements 55.1, 55.2 along the drive shaft 10, is shown only symbolically in FIG. 9 and can be implemented in various designs. For example, a rolling element cage containing rolling elements without an external housing can be provided to form needle rings. It is also possible for a needle bearing to be provided with inner rings; this requires only a simply drawn shaft. Finally, it is also possible to implement a needle bearing without an inner ring; this requires a hardened race on the drive shaft 10. All the foregoing designs can be embodied in single-row form, i.e., with one row of rolling elements, and in multi-row form— with two rolling element rows 55.1, 55.2.

Owing to the elimination of the requirement for a first, second axle bearing 51, 52 or further axle bearings, such as counter axle bearing 54, which takes up installation space, the embodiment shown in FIG. 9 is also distinguished by a particularly short construction, not only along the motor axis MA but, owing to the low height of the needle bearing 55, also in a radial direction. FIG. 9 also shows a cable harness 80, which is passed to the outside through the housing cap 32—this being applicable in principle in all the foregoing embodiments in FIG. 2 to FIG. 8.

Overall, the following advantages are obtained from the embodiments described above:
- a significant reduction in the installation space;
- a reduction in components;
- simplification of assembly;
- a crankshaft 1304/crankpin 20 becomes an integrated component of the rotor;
- elimination of the separate balance weight through integration into the rotor, e.g., as a hole or offset (FIG. 5, FIG. 6 and FIG. 8);
- elimination of one of two covers on the motor space axis, e.g., of the crankcase cover (cf. housing cover plate 34 in FIG. 6);
- integration of the entire motor in the crankcase is possible by means of the drive housing 30;
- elimination of a separate crankshaft with balance weight;
- simpler assembly and design of the motor bearings (axle bearings 51, 52, counter axle bearing 54) through elimination of pressure assembly;
- improvement of the magnetic properties in variants without a motor shaft passing all the way through (FIG. 6-FIG. 8);
- now only support for the motor shaft (drive shaft 10) without torsional loading (e.g., in FIG. 4);

simple, inexpensive support by a needle sleeve instead of twin ball or rolling bearings possible (FIG. 9);

simple balancing of the rotor bell 1422, e.g., by means of holes;

weight saving due to smaller construction of the overall assembly;

energy-saving through better efficiency;

increase in the service life of the motor/motor bearings through elimination of brush abrasion;

reduction in wow and flutter through increased rotational moment of inertia of an external-rotor-type rotor; as a result reduced susceptibility to wobbling at high current amplitudes;

improved smoothness of running; preferably through the use of an external rotor;

external rotor with high rotational moment of inertia and better evenness of running (structure borne noise) with a reduced mass but optimum mass distribution;

larger diameter of the rotating motor part (energy accumulator);

high moment of inertia compensates the wow and flutter owing to the lower overall weight and reduces the structure borne noise;

winding of the stator 1410 generally does not require potting;

wound armature 1412 is stationary and no longer has to be balanced;

no brush wear and hence also:
  no more contamination, especially of the filters and of the granules (absorbent) for air drying; and
  good cooling and ventilation simpler and free from contamination;
  rotor bell can simultaneously be designed as a fan for cooling the winding;

extension of service life;

use in hybrid or electric vehicles is advantageous for acoustic reasons; suitable EMC measures already provided; and shorter designs overall for more rigid configurations of the drive shaft are possible It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressor system for operating a compressed air supply system of a vehicle, the compressor system comprising:
   a compressor including a brushless DC electric motor comprising a control circuit, the control circuit comprising power electronics; and
   a pneumatic compressor element;
   wherein the electric motor comprises a stator and an external rotor, wherein the external rotor comprises a rotor bell, and wherein the rotor bell is attached, via a frictional and/or positive connection, to a drive shaft and/or a crankpin;
   wherein a cantilever suspends the stator from a motor case, wherein the stator comprises an armature defining a first circumferential channel and the cantilever comprises a first annular protrusion disposed therein;
   wherein the cantilever defines a second circumferential channel and the armature comprises a second annular protrusion disposed therein; and
   wherein the cantilever is disc-shaped.

2. The system as claimed in claim 1, wherein the pneumatic compressor element is a single-cylinder, two-cylinder or multi-cylinder compressor element.

3. The system as claimed in claim 1, wherein the motor includes the drive shaft, the drive shaft being coupled to the rotor,
   wherein the rotor rotatably surrounds the stator and is separated from the stator by an air gap,
   wherein the rotor includes the rotor bell and a plurality of permanent magnets,
   wherein the stator includes an armature having an armature winding connected to the control circuit,
   wherein the pneumatic compressor element has at least one connecting rod and at least one piston configured to be driven via the crankshaft coupled to the drive shaft,
   wherein the control circuit includes at least one electronic relay and/or a DC-DC converter, and
   wherein the power electronics unit has a DC voltage input and an AC voltage output.

4. The system as claimed in claim 3, wherein the crankpin is formed eccentrically with respect to a central motor axis.

5. The system as claimed in claim 3, wherein the armature is a laminated core.

6. The system as claimed in claim 1, wherein the control circuit is configured to determine rotational energy stored by the rotor and to monitor and/or perform open-loop or closed-loop control of an angular speed of the rotor.

7. The system as claimed in claim 1, wherein the control circuit is configured to:
   perform open-loop or closed-loop control of a speed of the rotor, and
   adjustably set an operating voltage at the motor and/or a rotary field frequency.

8. The system as claimed in claim 1, wherein the motor is configured for operation in a pressure control mode, and wherein the control circuit includes a control module connected to a pressure control interface of the pneumatic compressor element to operate the motor in the pressure control mode.

9. The system as claimed in claim 1, wherein the control circuit is configured to implement a startup and/or rundown control operation to limit a startup current and/or a rundown current of the motor to adjustably set an operating voltage at the motor.

10. The system as claimed in claim 1, wherein the control circuit is configured to adapt an operating voltage to an onboard electrical system voltage in at least one voltage range, comprising:
    (i) a voltage between 8 V and 50 V, and/or
    (ii) a voltage between 10 V and 15 V, and/or
    (iii) a voltage between 14 V and 37 V, and/or
    (iv) a voltage between 42 V and 49 V, and/or
    (v) a voltage between 200-650 V.

11. The system as claimed in claim 1, wherein the drive shaft, the crankpin and at least one connection part form a crank mechanism component, the crank mechanism component being supported by a bearing structure comprising a big end bearing and at least one axle bearing.

12. A compressed air supply system for operating a pneumatic system of a vehicle, the compressed air supply system comprising:

a compressed air feed;
a compressed air port configured to provide compressed air to the pneumatic system;
a vent port;
a pneumatic main line having an air dryer between the compressed air feed and the compressed air port;
a vent line having a vent valve between the compressed air port and the vent port; and
the compressor system as claimed in claim 1,
wherein the compressed air feed is supplied with compressed air produced by the compressor system.

13. The compressed air supply system as claimed in claim 12; wherein the pneumatic system is a vehicle air spring system; and further comprising a pneumatic main line for operating the vehicle air spring system with a compressed air flow and/or to condition compressed air; a compressed air feed connected to the compressor; and a compressed air port configured to provide compressed air to the air spring system, the compressed air feed and the compressed air port being pneumatically connected.

14. A vehicle, comprising a pneumatic system; and the compressed air supply system as claimed in claim 12 for operating the pneumatic system with a compressed air flow.

15. The vehicle as claimed in claim 14, wherein the pneumatic system is a vehicle air spring system.

16. The compressed air supply system as claimed in claim 12, wherein the pneumatic system is an air spring system and/or a brake and/or a conditioning device for compressed air.

17. The system as claimed in claim 1, wherein the control circuit with the power electronics unit is configured to determine rotational energy stored by the rotor and to control an angular speed of the rotor based on the stored rotational energy.

18. The system of claim 1, wherein the electric motor further comprises:
the drive shaft and the crankpin, the crankpin being attached to the drive shaft, the crankpin and at least one connection part forming a crank mechanism component;
a balance weight disposed eccentrically with respect to a central axis of the motor.

19. The system of claim 1, wherein the electric motor further comprises the drive shaft, the driveshaft being supported in a first axle bearing, the first axle bearing being disposed outside the rotor bell.

20. The system of claim 1, wherein the cantilever is directly affixed to the armature of the stator.

21. The system of claim 1, wherein the cantilever comprises a cylindrical first section and a funneled second section, the first annular protrusion extending from the funneled second section, the second circumferential channel being defined by and within the funneled second section.

22. The system of claim 21, wherein the armature comprises a laminated core;
the driveshaft, the crankpin, and at least one connection part forming a crank, the crank being supported by a bearing structure comprising an end bearing and at least one axle bearing, the driveshaft being coupled to the rotor, the crankpin being attached to the driveshaft integrally or via an interference fit or other frictional and/or positive connection.

23. The system of claim 1, wherein the first annular protrusion fully occupies the first annular channel and the second annular protrusion fully occupies the second annular channel.

24. The system of claim 1, further comprising:
a roller bearing assembly disposed radially inward of the cantilever and configured to rotationally support the driveshaft;
wherein the motor case comprises a support ring confining an outer race of the roller bearing assembly.

25. The system of claim 1, wherein the motor case includes a first end cap, a second end cap, and an annular cover extending therebetween, the system further comprising:
a first roller bearing assembly and a second roller bearing assembly each journaling the driveshaft;
wherein the first end cap includes a first support ring, the first roller bearing assembly being fitted within and against the first support ring;
wherein the second end cap includes a second support ring, the second roller bearing assembly being fitted within and against the second support ring, the second support ring and the second roller bearing assembly being disposed radially inward of the cantilever;
wherein the first roller bearing assembly is an axle bearing assembly, the drive shaft, the crankpin, and at least one connection part form a crank, the crank being supported by a bearing structure, the bearing structure comprising a big end bearing assembly and the axle bearing assembly, and
the driveshaft being coupled to the rotor, the crankpin being attached to the driveshaft integrally or via an interference fit or other frictional and/or positive connection.

26. A compressor system for operating a compressed air supply system of a vehicle, the compressor system comprising:
a compressor including a brushless DC electric motor comprising a control circuit, the control circuit comprising power electronics, and
a pneumatic compressor element;
wherein the electric motor comprises a stator and an external rotor, wherein the external rotor comprises a rotor bell, and wherein the rotor bell is attached, via a frictional and/or positive connection, to a drive shaft and/or a crankpin;
wherein a cantilever suspends the stator from a motor case, wherein the stator comprises an armature defining a first circumferential channel and the cantilever comprises a first annular protrusion disposed therein;
wherein the cantilever defines a second circumferential channel and the armature comprises a second annular protrusion disposed therein;
wherein the cantilever is disc-shaped, and
wherein the control circuit is configured to (i) measure rotational energy stored in the rotor and (ii) monitor and/or adjust a rotational velocity of the rotor.

27. The system of claim 1, the control circuit is configured to adjust the rotational velocity of the rotor based on the measured rotational energy stored in the rotor.

28. A compressor system for operating a compressed air supply system of a vehicle, the compressor system comprising:
a compressor including a brushless DC (BLDC) external rotor motor having a control circuit with a power electronics unit; and
a pneumatic compressor element,
wherein the BLDC external rotor motor includes a stator suspended within a motor case by a cantilever;
wherein the stator comprises an armature defining a first circumferential channel, wherein the cantilever comprises a first annular protrusion disposed therein, wherein the cantilever defines a second circumferential channel, and wherein the armature comprises a second annular protrusion disposed therein.

29. The system of claim 28, wherein the cantilever is disc-shaped and comprises a cylindrical first section and a funneled second section, the first annular protrusion extending from the funneled second section, the second circumferential channel being defined by and within the funneled second section, the system comprising:

a roller bearing assembly disposed radially inward of the cantilever and configured to rotationally support a driveshaft, the motor case comprising a support ring confining an outer race of the roller bearing assembly, the motor comprising the driveshaft, the driveshaft being coupled to a rotor of the motor;

a bearing structure comprising an axle bearing and an end bearing assembly;

a crankpin attached to the driveshaft integrally or via an interference fit or other frictional and/or positive connection;

wherein the driveshaft, the crankpin, and at least one connection part form a crank, the crank being supported by the bearing structure.

* * * * *